United States Patent
Kim et al.

(10) Patent No.: US 7,860,042 B2
(45) Date of Patent: Dec. 28, 2010

(54) REVERSE POWER CONTROL METHOD AND APPARATUS IN A MOBILE COMMUNICATION SYSTEM IN WHICH MOBILE STATION DETERMINES REVERSE DATA RATE

(75) Inventors: Youn-Sun Kim, Seongnam-si (KR); Hwan-Joon Kwon, Gyeonggi-do (KR); Dong-hee Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 2005 days.

(21) Appl. No.: 10/834,800

(22) Filed: Apr. 29, 2004

(65) Prior Publication Data

US 2004/0218559 A1  Nov. 4, 2004

(30) Foreign Application Priority Data

Apr. 29, 2003 (KR) .................... 10-2003-0027345
Jul. 15, 2003 (KR) .................... 10-2003-0048470

(51) Int. Cl.
*H04B 7/185* (2006.01)
(52) U.S. Cl. .............. 370/318; 370/232; 370/252; 370/332; 370/491
(58) Field of Classification Search .......... 455/522, 455/63.1, 67.11, 452.1, 452.2; 370/232–235, 370/252–253, 318, 332–333, 491
See application file for complete search history.

(56) References Cited

U.S. PATENT DOCUMENTS

| | | | |
|---|---|---|---|
| 6,151,508 A | 11/2000 | Kim et al. | |
| 2003/0050086 A1* | 3/2003 | Lee et al. | 455/522 |
| 2004/0179494 A1* | 9/2004 | Attar et al. | 370/332 |
| 2004/0246924 A1* | 12/2004 | Lundby et al. | 370/332 |
| 2005/0147063 A1* | 7/2005 | Pi et al. | 370/335 |

FOREIGN PATENT DOCUMENTS

| | | |
|---|---|---|
| CA | 2 485 980 | 12/2003 |
| KR | 10-2002-0004452 | 1/2002 |
| KR | 10-2003-0035969 | 5/2003 |
| WO | WO 01/86837 | 11/2001 |
| WO | WO 03/105381 | 12/2003 |

* cited by examiner

*Primary Examiner*—Dai A Phuong
(74) *Attorney, Agent, or Firm*—The Farrell Law Firm, LLP

(57) ABSTRACT

A method and apparatus for determining a power control target setpoint and transmission power of a secondary pilot signal for power control and channel estimation on a signal transmitted in a reverse direction in a mobile communication system. A mobile station determines transmission power of a secondary pilot signal based on a data rate of a reverse traffic channel to be transmitted. A base station adjusts a power control target setpoint according to received reverse data rate information, and performs channel estimation (or channel compensation) using a primary pilot signal and a secondary pilot signal (or a reverse rate indicator (RRI) channel signal).

26 Claims, 11 Drawing Sheets

REVERSE POWER CONTROL METHOD AND APPARATUS IN A MOBILE COMMUNICATION SYSTEM IN WHICH MOBILE STATION DETERMINES REVERSE DATA RATE

PRIORITY

This application claims priority under 35 U.S.C. §119 to an application entitled "Reverse Power Control Method in a Mobile Communication System in which Mobile Station Determines Reverse Data Rate" filed in the Korean Intellectual Property Office on Apr. 29, 2003 and assigned Serial No. 2003-27345, an application entitled "Reverse Power Control Method in a Mobile Communication System in which Mobile Station Determines Reverse Data Rate" filed in the Korean Intellectual Property Office on Jul. 15, 2003 and assigned Serial No. 2003-48470, the contents of both of which are incorporated herein by reference.

BACKGROUND OF THE INVENTION

1. Field of the Invention

The present invention relates generally to a reverse power control method and apparatus in a mobile communication system, and in particular, to a method and apparatus for controlling the transmission power of a reverse pilot channel to improve reverse traffic reception performance of a base station in connection with a data rate of a reverse traffic channel in a mobile communication system in which a mobile station determines a data rate of the reverse traffic channel.

2. Description of the Related Art

Typical mobile communication systems can be classified into a system for supporting a voice service and a system for supporting a data service. A typical example of such systems includes a Code Division Multiple Access (CDMA) system. A current CDMA system supporting only a voice service follows Interim Standard-95 (IS-95). With the progress of communication technology, mobile communication systems are being developed to support high-speed data services. For example, a first generation CDMA2000 (referred to as CDMA2000 1x) standard has been proposed which supports both the voice service and the data service, and a 1xEVDO (Evolution in Data Only) standard has been proposed which supports only a high-speed data service by assigning all possible resources to a data service based on a CDMA2000 1x system.

Signal transmission paths in a mobile communication system are generally classified into a forward path, i.e. a link in a direction from a base station covering a predetermined area (referred to as a cell) to a mobile station, and a reverse path, i.e. a link in a direction from a mobile station to a base station. In addition, a mobile station can exchange reverse/forward data with a base station while moving between cells.

A signal transmitted in a reverse direction by a mobile station includes a reverse traffic channel (R-TRCH), a reverse pilot channel (R-PICH), and various control channels. The reverse traffic channel has a variable data rate according to the amount of traffic transmitted thereon. The reverse pilot channel transmits control signals for channel compensation (i.e., channel compensation) and power control on a traffic channel, and is provided with a level of transmission power which is generally in proportion to a data rate of the traffic channel. As a data rate of a reverse traffic channel becomes greater, a base station needs to receive a pilot signal having higher power in order to perform smooth channel compensation on the traffic channel. Here, "channel compensation" refers to an operation in which a base station receiver compensates for an influence of a radio channel from a received signal so that the received signal can be demodulated.

A base station measures a received power to noise ratio of a reverse pilot channel, and controls the transmission power of a mobile station according to the measurement result. Such a transmission power control on a mobile station is performed in order to maximize reverse system capacity by minimizing interference occurring when a transmission signal transmitted by one mobile station affects a reverse signal from another mobile station, while maintaining reception performance of a reverse traffic channel.

Power control on a reverse signal performed in a CDMA2000 1x mobile communication system can be classified into an inner loop power control and an outer loop power control. In the inner loop power control, a base station transmits a power control bit (PCB) to a mobile station every time slot (1.25 ms) to control transmission power of the mobile station so that a received pilot energy to noise ratio $Ep/Nt$ of a signal transmitted by the mobile station approaches a power control target setpoint. In the outer loop power control, the setpoint is adjusted every frame. The outer loop power control is used to maintain reception performance of a received traffic channel by adjusting the power control target setpoint.

In an exemplary method for performing the outer loop power control, if an error occurs in data received over a reverse traffic channel, the setpoint is increased by xdB, and if no errors occur, the setpoint is decreased by $x/(1/FER-1)$ dB. FER denotes a frame error rate desired by a base station, and has a value between 0 and 1. For example, when x has a value of 1 and a desired error rate is 0.01, if an error occurs in reception data on a traffic channel, the setpoint is increased by 1 dB, and otherwise, the setpoint is reduced by $1/99$ dB.

In addition to the outer loop power control another criterion for adjusting a power control target setpoint in a base station is a pilot reference level which is mapped to a rate of data transmitted by a mobile station. In the CDMA2000 1x standard, pilot reference levels shown in Table 1 below are defined according to data rates, and when a mobile station changes its reverse data rate, a base station adjusts a power control target setpoint accordingly.

TABLE 1

| Reverse Data Rate | Pilot Reference Level |
| --- | --- |
| 9.6 kbps | 0 |
| 19.2 kbps | 1 |
| 38.4 kbps | 11 |
| 76.8 kbps | 21 |
| 153.6 kbps | 36 |
| 307.2 kbps | 54 |

Shown in Table 1 are pilot reference levels mapped to corresponding data rates, defined in the CDMA2000 1x standard. The pilot reference level for each data rate specified in Table 1 is a value in a unit of 0.125 dB. For example, a pilot reverence level 'x' actually indicates $x \div 8$ dB.

FIG. 1 is a diagram illustrating a power control method performed in a general CDMA2000 1x mobile communication system. Referring to FIG. 1, a base station instructs a mobile station to increase a data rate of an $(i+3)^{th}$ frame from 38.4 kbps to 76.8 kbps (Step 110). In this case, the base station increases a power control target setpoint from the $(i+3)^{th}$ frame in order to increase a reverse data rate. A level by which the power control target setpoint is to be increased is determined by the pilot reference levels specified in Table 1.

Because a pilot reference level for 38.4 kbps is 11 and a pilot reference level for 76.8 kbps is 21 in Table 1, the base station increases the power control target setpoint by 1.25 (=10/8) dB corresponding to a difference value 10 between the pilot reference levels 11 and 21. Here, ⅛ dB represents a minimum unit by which the power control target setpoint is adjusted.

In the CDMA2000 1x mobile communication system, because a data rate of a mobile station is adjusted under control of a base station as stated above, the base station increases (up-adjusts) or decreases (down-adjusts) the power control target setpoint before the mobile station changes its data rate. The base station adjusts the power control target setpoint before the data rate is actually changed, which is done in order to maintain reception performance at the changed new data rate.

However, unlike the CDMA2000 1x mobile communication system, a 1xEVDO mobile communication system cannot adjust the power control target setpoint before a change in the data rate because, in the 1xEVDO mobile communication system, a data rate of a traffic channel transmitted by a mobile station is determined, not by a base station, but by the mobile station. In this case, the base station must adjust the related power control target setpoint after the mobile station changes its data rate.

FIG. 2 is a diagram illustrating the adjusting of a power control target setpoint in a base station at the change in a data rate of a reverse traffic channel in a general mobile communication system. Referring to FIG. 2, a mobile station uses a data rate of 38.4 kbps at an $i^{th}$ frame, increases the data rate to 76.8 bkps at an $(i+1)^{th}$ frame (Step 210), and increases the data rate to 153.6 kbps at an $(i+2)^{th}$ frame (Step 220) and maintains the data rate of 153.6 kbps at an $(i+3)^{th}$ frame. The data rates at the $(i+1)^{th}$ frame and the $(i+2)^{th}$ frame are increased compared with the data rates at their previous frames. Although the mobile station has increased the data rate at the $(i+1)^{th}$ frame compared with that of the previous frame in the manner stated above, a base station can identify the increase in the data rate after the base station receives a reverse rate indicator (RRI) over an RRI channel transmitted together with traffic data at the $(i+1)^{th}$ frame.

The RRI delivers information (traffic control information) related to a data rate, the number of transmission bits, a modulation scheme and a coding scheme of traffic data transmitted in the same time period (i.e., frame), to the base station. The reason why the mobile station transmits the RRI is as follows. In the 1xEVDO mobile communication system, because a data rate of a traffic channel is determined, not by a base station, but by a mobile station, the base station must be informed of the reverse traffic control information as stated above in order to receive reverse traffic data. That is, the base station can detect a rate of the traffic data transmitted by the mobile station at the $(i+1)^{th}$ frame after it receives the $(i+1)^{th}$ frame data.

In this case, the base station can adjust the power control target setpoint considering a data rate of a traffic channel, used at the $(i+1)^{th}$ frame, after the passage of the $(i+1)^{th}$ frame. That is, the power control target setpoint used for controlling power of the $(i+1)^{th}$ frame is not for the $(i+1)^{th}$ frame (76.8 kbps) but for the $i^{th}$ frame (38.4 kbps) or the previous frame.

When the power control target setpoint is not adjusted for at the point where a data rate is increased from 38.4 kbps to 76.8 kbps, like the $(i+1)^{th}$ frame of FIG. 2, reception performance of a traffic channel is deteriorated for the following reason. Since the power control target setpoint corresponding to the previous low data rate is used, although the data rate was increased, a reverse pilot signal having appropriate power to receive data on a traffic channel that uses the increased data rate is not received at the base station. The reverse pilot signal is used for channel compensation on the traffic channel, and in this case, the base station cannot secure a reception power estimation value sufficient for channel compensation, and also cannot obtain desired reception performance because reception power of the traffic channel is also less than an appropriate level.

Even when the data rate is increased to 153.6 kbps at, for example, the $(i+2)^{th}$ frame, the base station can set a power control target setpoint for a data rate of 153.6 kbps after it receives RRI transmitted by the mobile station at the $(i+2)^{th}$ frame. Because a data rate used at the $(i+3)^{th}$ frame is identical to a data rate used at the previous frame or the $(i+2)^{th}$ frame, the base station performs reverse power control using a power control target setpoint appropriate for receiving a frame at 153.6 kbps.

Comparing power of the $(i+2)^{th}$ frame with power of the $(i+3)^{th}$ frame in FIG. 2, it is noted that the $(i+3)^{th}$ frame is transmitted at higher power although it has the same data rate as the $(i+2)^{th}$ frame, for the following reason. That is, while a power control target setpoint used for controlling the transmission power of a mobile station at the $(i+3)^{th}$ frame was for 153.6 kbps, a power control target setpoint used for controlling the transmission power of the mobile station at the $(i+2)^{th}$ frame is for 76.8 kbps. Therefore, the base station can receive signals on a traffic channel and a pilot channel at the $(i+3)^{th}$ frame at sufficient reception power, but it cannot receive signals on the traffic channel and the pilot channel at the $(i+2)^{th}$ frame at sufficient reception power.

As described above, in the 1xEVDO mobile communication system in which a mobile station determines a data rate of a reverse traffic channel, a one-frame delay occurs in controlling a power control target setpoint considering a data rate of a reverse traffic channel. In this case, the base station's reception power for maintaining reception performance is not sufficiently secured, causing deterioration in the reception performance.

SUMMARY OF THE INVENTION

It is, therefore, an object of the present invention to provide a reverse power control method and apparatus for improving the reverse traffic signal reception performance of a base station in a mobile communication system in which a mobile station determines a data rate of a reverse traffic channel.

It is another object of the present invention to provide a method and apparatus for adjusting a power control target setpoint for controlling reverse transmission power by a base station in a mobile communication system in which a mobile station determines a data rate of a reverse traffic channel.

In accordance with one aspect of the present invention, there is provided a method for controlling by a mobile station transmission power of a reverse channel in a mobile communication system. The method comprises the steps of determining during every frame a data rate of a reverse traffic channel; comparing a first data rate of a current frame with a second data rate of a previous frame; and if the first data rate is higher than the second data rate as a result of the comparison, transmitting to a base station a signal on a primary pilot channel having transmission power corresponding to a pilot reference level of the second data rate and a signal on a secondary pilot channel for reverse channel compensation.

In accordance with another aspect of the present invention, there is provided a method for controlling transmission power of a reverse channel by a base station in a mobile communication system. The method comprises the steps of receiving a signal on a reverse primary pilot channel transmitted during every frame and a signal on a secondary pilot channel optionally transmitted according to an increase in a reverse data rate of the mobile station; and if both a signal on the primary pilot channel and a signal on the secondary pilot channel have been received from the mobile station, channel-compensating the signal on the reverse traffic channel using reception power of the pilot channels.

In accordance with further another aspect of the present invention, there is provided a mobile station transmission apparatus for controlling transmission power of a reverse channel in a mobile communication system. The apparatus comprises an encoding section for channel-encoding reverse data transmitted over a reverse traffic channel and a signal on a reverse rate indicator (RRI) channel indicating the reverse data rate; and a transmission power controller for receiving a signal on a secondary pilot channel that is optionally transmitted according to the encoded reverse data and RRI channel signal, a signal on a reverse primary pilot channel, and an increase in the reverse data rate of the mobile station, comparing a first data rate of a current frame with a second data rate of a previous frame, and adjusting a transmission power gain of the input signals according to the comparison result.

In accordance with still another aspect of the present invention, there is provided a base station reception apparatus for controlling transmission power of a reverse channel in a mobile communication system in which a mobile station determines a reverse data rate. The apparatus comprises a first channel estimator for channel-compensating a signal on a reverse rate indicator (RRI) channel including reverse traffic control information received from the mobile station, using a signal on a primary pilot channel; a decoder for decoding the traffic control information output from the channel estimator; a power control setpoint controller for controlling a power control target setpoint for the mobile station based on the traffic control information; a power control bit generator for generating a power control bit to be transmitted to the mobile station based on the power control target setpoint; a traffic channel estimation controller for determining whether or not to perform channel compensation on a reverse traffic channel using the traffic control information output from the decoder; and a second channel estimator for performing channel compensation on the reverse traffic channel under the control of the traffic channel estimation controller.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Several preferred embodiments of the present invention will now be described in detail with reference to the annexed drawings. In the following description, a detailed description of known functions and configurations incorporated herein has been omitted for conciseness.

The present invention provides a method of using one or two pilot channels and adjusting the transmission power of each pilot channel in a 1xEVDO mobile communication system in which a mobile station determines a reverse data rate. Two pilot signals transmitted by the mobile station are classified as a primary pilot signal and a secondary pilot signal. The primary pilot signal is used by a base station to perform power control on a reverse signal and perform channel estimation, and the secondary pilot signal is restrictively used by the base station to perform channel estimation on the reverse signal.

Figure 1:
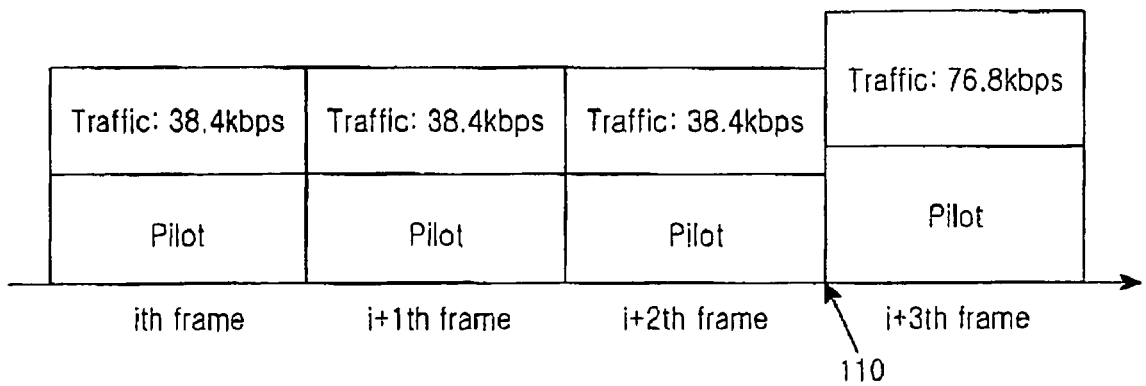
FIG. 1 is a diagram illustrating a power control method performed in a general CDMA2000 1x mobile communication system.
Figure 2:
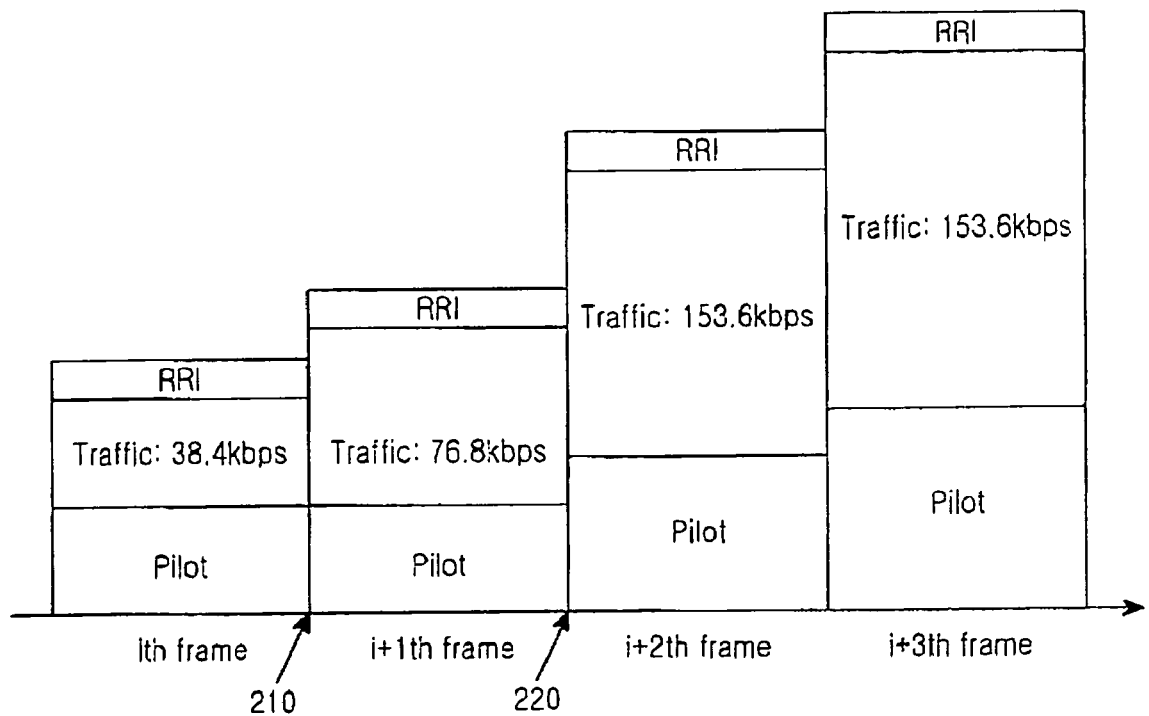
FIG. 2 is a diagram illustrating a procedure of adjusting a power control target setpoint in a base station at the change in a data rate of a reverse traffic channel in a general mobile communication system.
Figure 3:
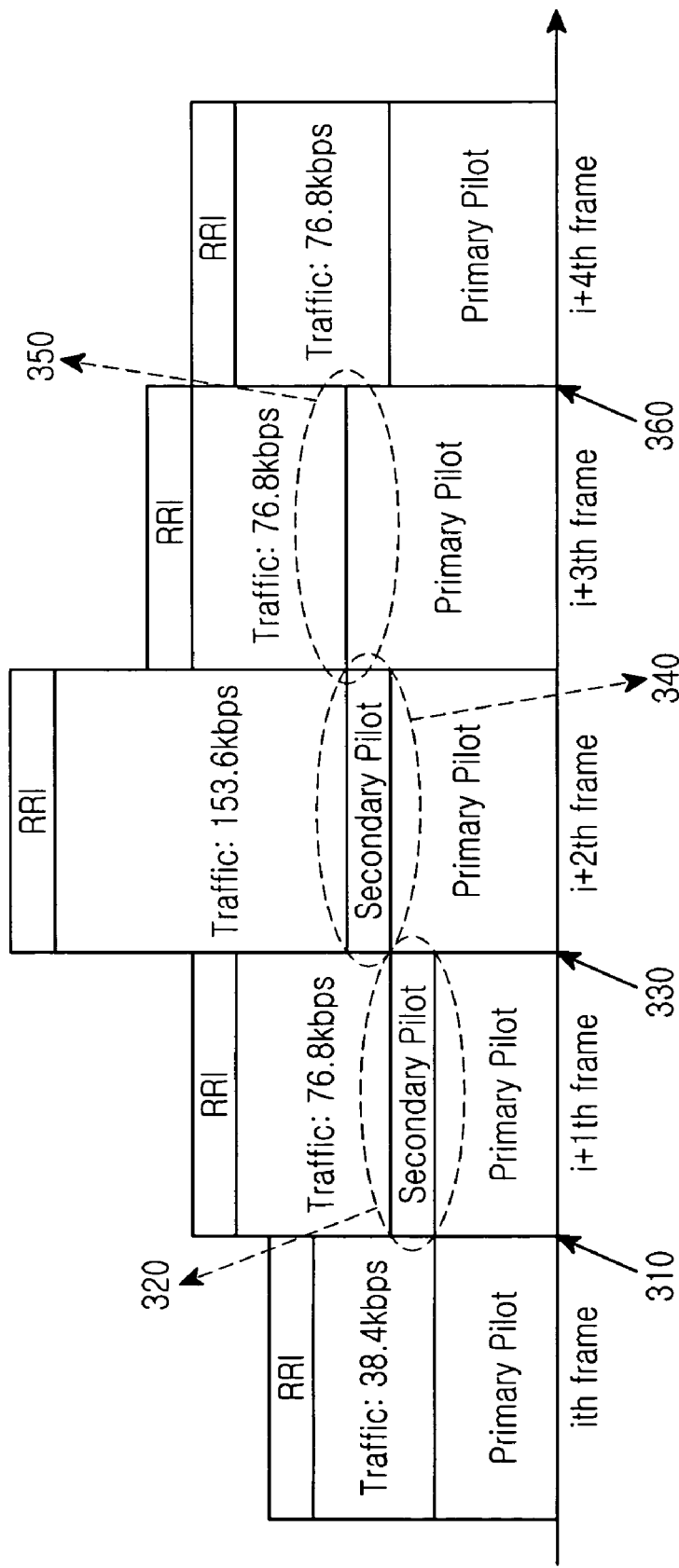
FIG. 3 is a diagram illustrating a reverse power control method performed in a mobile communication system in which a mobile station determines a reverse data rate, according to an embodiment of the present invention.

FIG. 3 is a diagram illustrating a reverse power control method performed in a mobile communication system in which a mobile station determines a reverse data rate, according to an embodiment of the present invention. A base station performs power control by measuring reception power of only a primary pilot signal and comparing the measured reception power with a power control target setpoint set by the base station itself. That is, the base station does not measure reception power of a secondary pilot signal in performing power control.

Referring to FIG. 3, a data rate of an $i^{th}$ frame is 38.4 kbps, and a mobile station increases the data rate to 76.8 kbps at an $(i+1)^{th}$ frame (Step 310). When the data rate is increased in this way, the mobile station transmits a secondary pilot signal with additional power necessary for performing efficient channel compensation, considering that a power control target setpoint of a base station will be adjusted with a delay of one frame (Step 320). The secondary pilot signal is set at a power level corresponding to the difference between the total pilot power necessary for receiving by the base station the $(i+1)^{th}$ frame at 76.8 kbps and primary pilot signal power.

If the base station, after receiving the $(i+1)^{th}$ frame data, determines that the data rate of 76.8 bkps, which is greater than the data rate of 38.4 kbps used when the mobile station transmitted the $i^{th}$ frame, is used, the base station determines that the mobile station has transmitted a secondary pilot signal with additional pilot power necessary for channel compensation at the $(i+1)^{th}$ frame (Step 330).

A data rate of an $(i+2)^{th}$ frame is also increased from that of the $(i+1)^{th}$ frame. In this case, the mobile station also transmits a secondary pilot signal with additional pilot power necessary for channel compensation by the base station, and the base station, after receiving RRI transmitted by the mobile station at the $(i+2)^{th}$ frame, determines that the secondary pilot signal was transmitted due to the increase in the data rate, and uses the received RRI for channel compensation (Step 340).

A data rate of an $(i+3)^{th}$ frame is decreased from that of the $(i+2)^{th}$ frame or the previous frame. Then the base station does not require the additional pilot power in addition to pilot power of the $(i+2)^{th}$ frame in receiving the $(i+3)^{th}$ frame data. Therefore, when the current data rate is decreased from the previous data rate as shown in the $(i+3)^{th}$ frame, the mobile station does not transmit a secondary pilot signal (Step 350). In addition, if the base station perceives from the RRI that a data rate of the traffic channel has decreased, the base station determines that no secondary pilot signal was transmitted.

A data rate of an $(i+4)^{th}$ frame is not changed from that of the $(i+3)^{th}$ frame or the previous frame. In this case, the base station does not require the additional pilot power in receiving the $(i+4)^{th}$ frame data, and decreases a power control target setpoint taking an decrease in a data rate of the previous frame data into consideration. Even when the current data rate is identical to the previous data rate as shown in the $(i+4)^{th}$ frame, the mobile station does not transmit a secondary pilot signal. In addition, if the base station determines from the RRI that a data rate of the traffic channel remains unchanged, the base station also determines that no secondary pilot signal was transmitted (Step 360).

Transmission power of the traffic channel is determined based on a data rate of a traffic channel and transmission power of a primary pilot signal and a secondary pilot signal. When the current data rate is increased from the previous data rate as shown in the $(i+1)^{th}$ and $(i+2)^{th}$ frames of FIG. 3, transmission power of a traffic channel transmitted by the mobile station is determined by $$P_{TRCH}=(P_{pp}+P_{sp})\times10^{TPR_{RATE}/10} \quad (1)$$

In Equation (1), $P_{TRCH}$ denotes transmission power of a traffic channel, $P_{pp}$ denotes transmission power of a primary pilot channel, and $P_{sp}$ denotes transmission power of a secondary pilot channel. Further, $TPR_{RATE}$ denotes a traffic to pilot power ratio (or a ratio of transmission power of a traffic channel to transmission power of a pilot channel), and is uniquely preset for each data rate. The $TPR_{RATE}$ is a value described in units of dB.

When the current data rate is not increased from the previous data rate as shown in the $(i+3)^{th}$ and $(i+4)^{th}$ frames of FIG. 3, transmission power of a traffic channel transmitted by the mobile station is determined by $$P_{TRCH}=P_{pp}\times10^{TPR_{RATE}/10} \quad (2)$$

Transmission power of an RRI channel is based on a data rate of a traffic channel and transmission power of a primary pilot signal and a secondary pilot signal, all of which are transmitted in the same time period. When the current data rate is increased from the previous data rate as shown in the $(i+1)^{th}$ and $(i+2)^{th}$ frames of FIG. 3, transmission power of an RRI channel transmitted by the mobile station is determined by $$P_{RRI}=(P_{pp}+P_{sp})\times10^{TPR_{RRI}/10} \quad (3)$$

In Equation (3), $P_{RRI}$ denotes transmission power of an RRI channel, and $TPR_{RRI}$ denotes an RRI to pilot power ratio (or a ratio of transmission power of an RRI channel to total transmission power of pilot channels), and are each preset according to a data rate of a traffic channel. The $TPR_{RRI}$ is a value described in units of dB.

When the current data rate is not increased from the previous data rate as shown in the $(i+3)^{th}$ and $(i+4)^{th}$ frames of FIG. 3, transmission power of an RRI channel transmitted by the mobile station is determined by $$P_{RRI}=P_{pp}\times10^{TPR_{RRI}/10} \quad (4)$$

Figure 4:
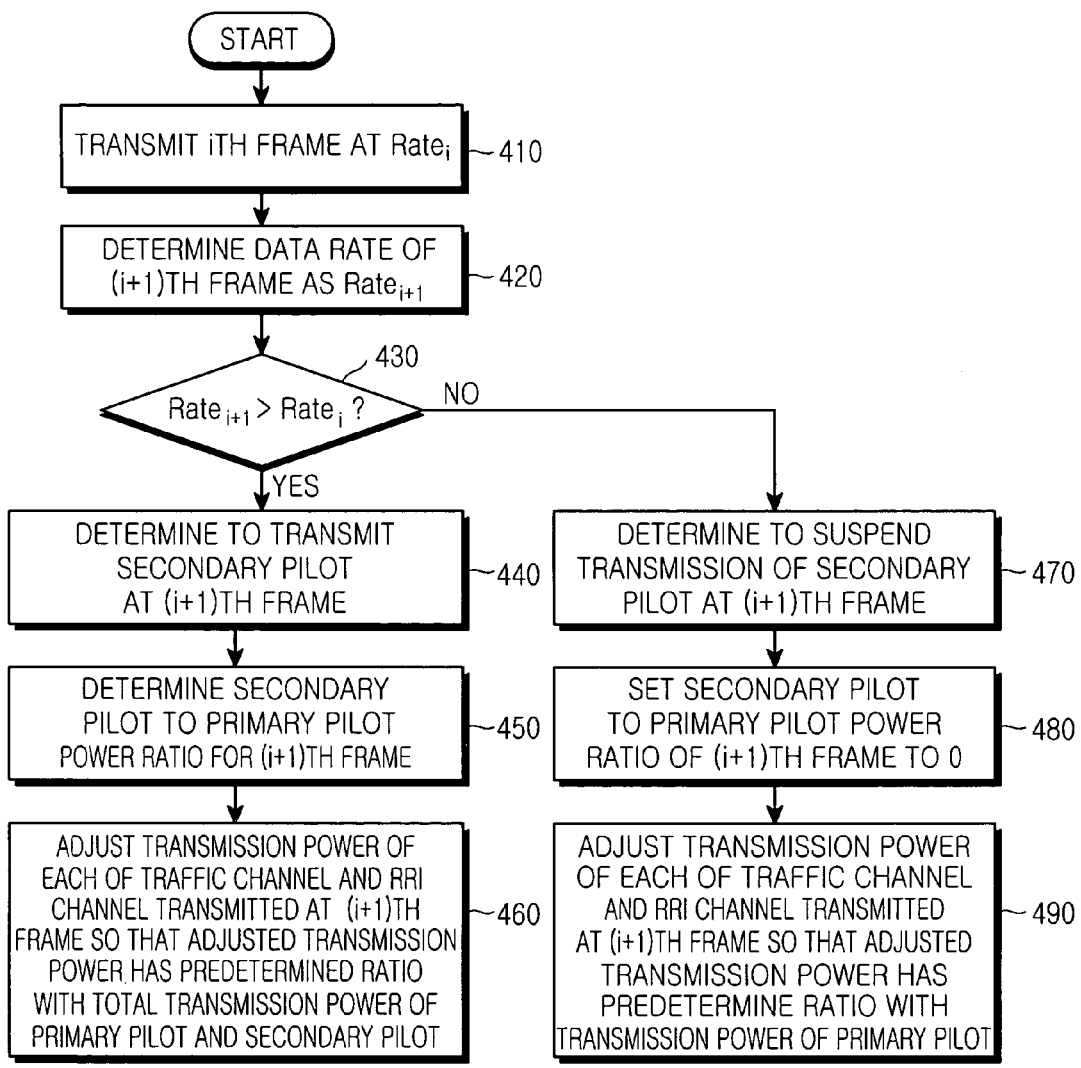
FIG. 4 is a flowchart illustrating a procedure for determining whether or not to transmit a secondary pilot signal and determining by a mobile station the transmission power of the secondary pilot signal according to an embodiment of the present invention.

FIG. 4 is a flowchart illustrating a procedure for determining whether or not to transmit a secondary pilot signal and determining the transmission power for the secondary pilot signal by a mobile station according to an embodiment of the present invention. Referring to FIG. 4, in step 410, the mobile station sets a data rate of a traffic channel to Rates at an $i^{th}$ frame. In step 420, the mobile station sets a data rate at an $(i+1)^{th}$ frame to $Rate_{i+1}$. In step 430, the mobile station compares the data rate $Rate_i$ of a traffic channel at the $i^{th}$ frame with the data rate $Rate_{i+1}$ at the $(i+1)^{th}$ frame. If the data rate $Rate_{i+1}$ at the $(i+1)^{th}$ frame is greater than the data rate $Rate_i$ of the previous frame, the mobile station determines to transmit a secondary pilot signal at the $(i+1)^{th}$ frame in step 440, and then determines transmission power of the secondary pilot signal by determining a secondary pilot to primary pilot power ratio at the $(i+1)^{th}$ frame in step 450.

The transmission power of the secondary pilot signal is determined such that a base station can obtain a total pilot reception power sufficient for a data rate at which the base station receives reverse data at a data rate for the $(i+1)^{th}$ frame. The "total pilot reception power" refers to the sum of transmission powers of a primary pilot signal and a secondary pilot signal that the base station receives. Transmission power of the secondary pilot signal is defined as a difference between a pilot reference level for Rates and a pilot reference level for the $Rate_{i+1}$ and can be calculated by $$P_{sp}=P_{pp}\times\{10^{(PREF_{i+1}-PREF_i)/80}-1\} \quad (5)$$

In Equation (5), $PREF_i$ and $PREF_{i+1}$ denote pilot reference levels for data rates at which the $i^{th}$ frame and the $(i+1)^{th}$ frame are transmitted, respectively, and have a value in a unit of dB. The pilot reference levels are based on the 0.125 dB scale as described in connection with Table 1.

After calculating transmission power of the secondary pilot signal, the mobile station calculates in step 460 transmission power of a traffic channel, an RRI channel and other channels, to be used at the same time period, i.e. the $(i+1)^{th}$ frame so that transmission power of each of the traffic channel and the RRI channel signal transmitted at the $(i+1)^{th}$ frame has a predetermined ratio with a total transmission power of the primary pilot and the secondary pilot. The transmission power of the traffic channel, the RRI channel and the other channels can be calculated using Equation (1) and Equation (2).

However, if it is determined in step 430 that the data rate Rate$_{i+1}$ at the (i+1)$^{th}$ frame is less than or equal to the data rate Rate$_i$ of the previous frame, the mobile station determines not to transmit a secondary pilot signal from the (i+1)$^{th}$ frame in step 470. Then, in step 480, the mobile station suspends transmission of the secondary pilot signal, meaning that a secondary pilot to primary pilot power ratio (or a transmission power ratio of the secondary pilot signal to the primary pilot signal) is 0. In step 490, the mobile station calculates transmission power of a traffic channel, an RRI channel and other channels, transmitted at the same time period so that transmission power of each of the traffic channel and the RRI channel signal transmitted at the (i+1)$^{th}$ frame has a predetermined ratio with a total transmission power of the primary pilot and the secondary pilot. The transmission power of the traffic channel, the RRI channel and the other channels can be calculated using Equation (2) and Equation (4).

Figure 5:
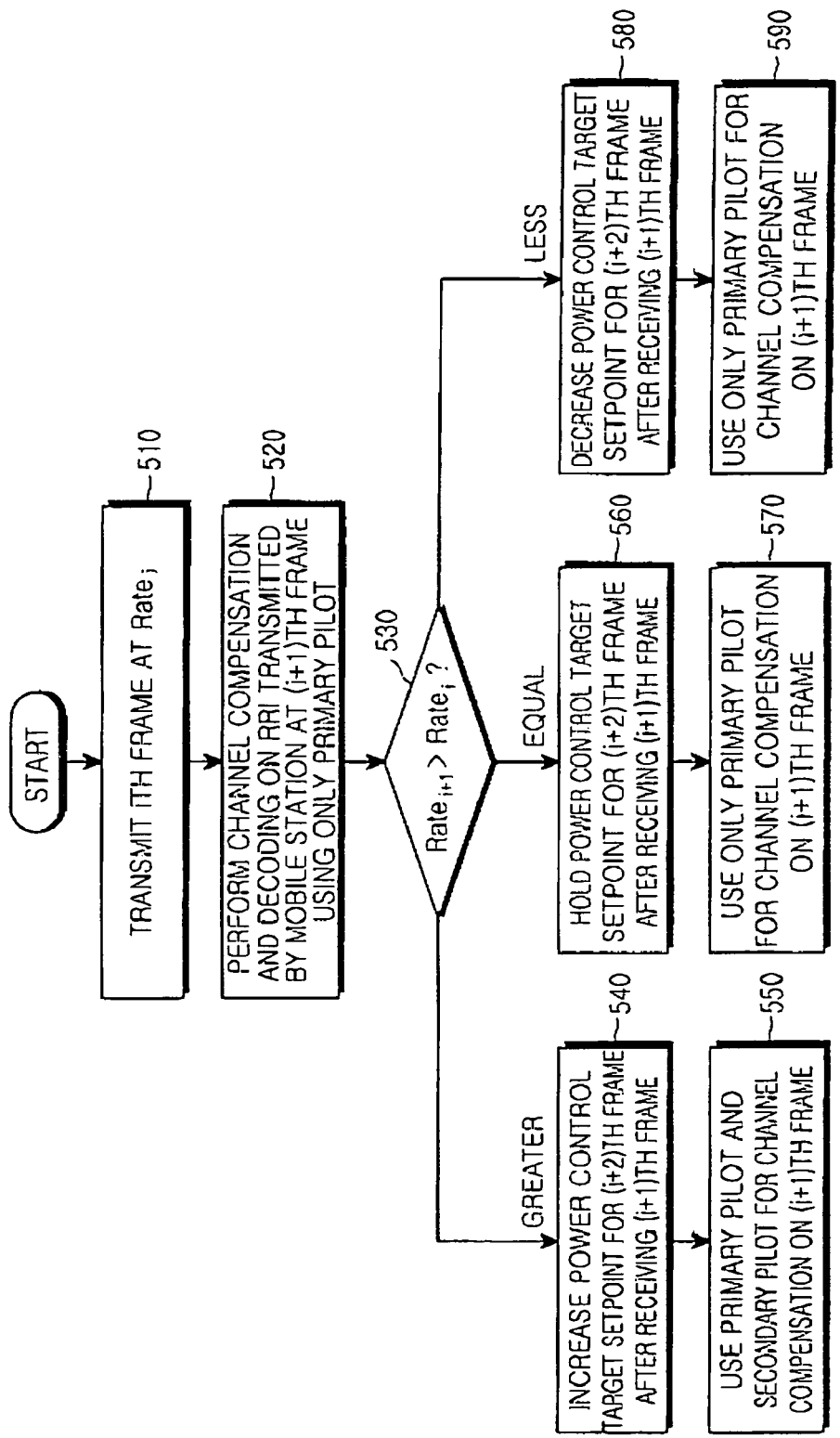
FIG. 5 is a flowchart illustrating a procedure for determining a reverse power control target setpoint and performing channel compensation by a base station according to an embodiment of the present invention.

FIG. 5 is a flowchart illustrating a procedure for determining a reverse power control target setpoint and performing channel compensation by a base station according to an embodiment of the present invention. Referring to FIG. 5, in step 510, the base station receives traffic data that a mobile station has transmitted at a data rate Rate$_i$ at an i$^{th}$ frame. In step 520, the base station detects a data rate used at the (i+1)$^{th}$ frame by channel-compensating the RRI received at the (i+1)$^{th}$ frame with a pilot signal and then decoding the channel-compensated pilot signal. In step 530, the base station compares a data rate Rate$_{i+1}$ of the (i+1)$^{th}$ frame with a data rate Rate$_i$ of the previous frame. If the Rate$_{i+1}$ is greater than the Rates, the base station receives the (i+1)$^{th}$ frame data and then increases a power control target setpoint for an (i+2)$^{th}$ frame in step 540. The increased power control target setpoint is determined by $$\text{Setpoint}_{i+2} = \text{Setpoint}_{i+1} \times 10^{(PREF_{i+1} - PREF_i)/80} \quad (6)$$

In Equation (6), Setpoint$_{i+2}$ and Setpoint$_{i+1}$ denote power control target setpoints used by the base station to perform power control on the (i+2)$^{th}$ and (i+1)$^{th}$ frames, respectively. In addition, PREF$_{i+1}$ and PREF$_i$ denote pilot reference levels for the (i+1)$^{th}$ frame and the i$^{th}$ frame, respectively, and have a value in units of dB. The pilot reference levels are multiples of 0.125 dB as described in connection with Table 1. In accordance with Equation (6), the base station determines a power control target setpoint for the (i+2)$^{th}$ frame based on data rates at which the mobile station has transmitted data at the i$^{th}$ frame and the (i+1)$^{th}$ frame, respectively. For example, if it is assumed that a data rate of 38.4 kbps was used at the i$^{th}$ frame and the data rate was increased to 153.6 kbps at the (i+1)$^{th}$ frame, the base station increases the power control target setpoint by 3.125 dB (=(36−11)÷8), or 2.0535 times.

After increasing the power control target setpoint, the base station performs channel compensation on the (i+1)$^{th}$ frame using both a primary pilot signal and a secondary pilot signal in step 550. As described above, because a secondary pilot signal is transmitted at a frame where a data rate is increased, channel compensation performance is improved by using the secondary pilot signal.

When both the primary pilot signal and the secondary pilot signal are used for channel compensation, the base station must combine the primary pilot signal with the secondary pilot signal. The primary pilot signal and the secondary pilot signal are combined by maximal ratio combining (MRC), and during MRC combining, gains individually multiplied by the primary pilot signal and the secondary pilot signal are determined in proportion to the transmission power values of the primary pilot signal and the secondary pilot signal. For example, if a transmission power ratio of the primary pilot signal to the secondary pilot signal is a:b, the primary pilot signal is multiplied by a gain 'a' and the secondary pilot signal is multiplied by a gain 'b'.

Returning again to FIG. 5, if it is determined in step 530 that the data rate Rate$_{i+1}$ used by the mobile station at the (i+1)$^{th}$ frame is equal to the data rate Rate$_i$ of the previous frame, the base station maintains the power control target setpoint for the (i+2)$^{th}$ frame to be equal to that of the (i+1)$^{th}$ frame in step 560. Thereafter, in step 570, the base station performs channel compensation on a traffic channel of the (i+1)$^{th}$ frame using only the primary pilot signal.

Finally, if it is determined in step 530 that the data rate Rate$_{i+1}$ used by the mobile station at the (i+1)$^{th}$ frame is less than the data rate Rate$_i$, the base station decreases the power control target setpoint for the (i+2)$^{th}$ frame from that of the (i+1)$^{th}$ frame in step 580. Thereafter, in step 590, the base station performs channel compensation on a traffic channel of the (i+1)$^{th}$ frame using only the primary pilot signal. The decreased power control target setpoint is determined by $$\text{Setpoint}_{i+2} = \text{Setpoint}_{i+1} \times 10^{(PREF_{i+1} - PREF_i)/80} \quad (7)$$

As shown in FIG. 5, the base station can perceive the presence of a secondary pilot signal after it detects a data rate of a corresponding frame. When the secondary pilot signal is used in order to perform inner loop power control, an additional one-frame delay is inevitably needed for power control, causing performance deterioration. Therefore, the base station uses only the primary pilot signal in performing inner loop power control. The base station measures only the primary pilot signal, compares the measured primary pilot signal with the power control target setpoint, and then instructs the mobile station to increase or decrease its transmission power according to the comparison result.

Figure 6:
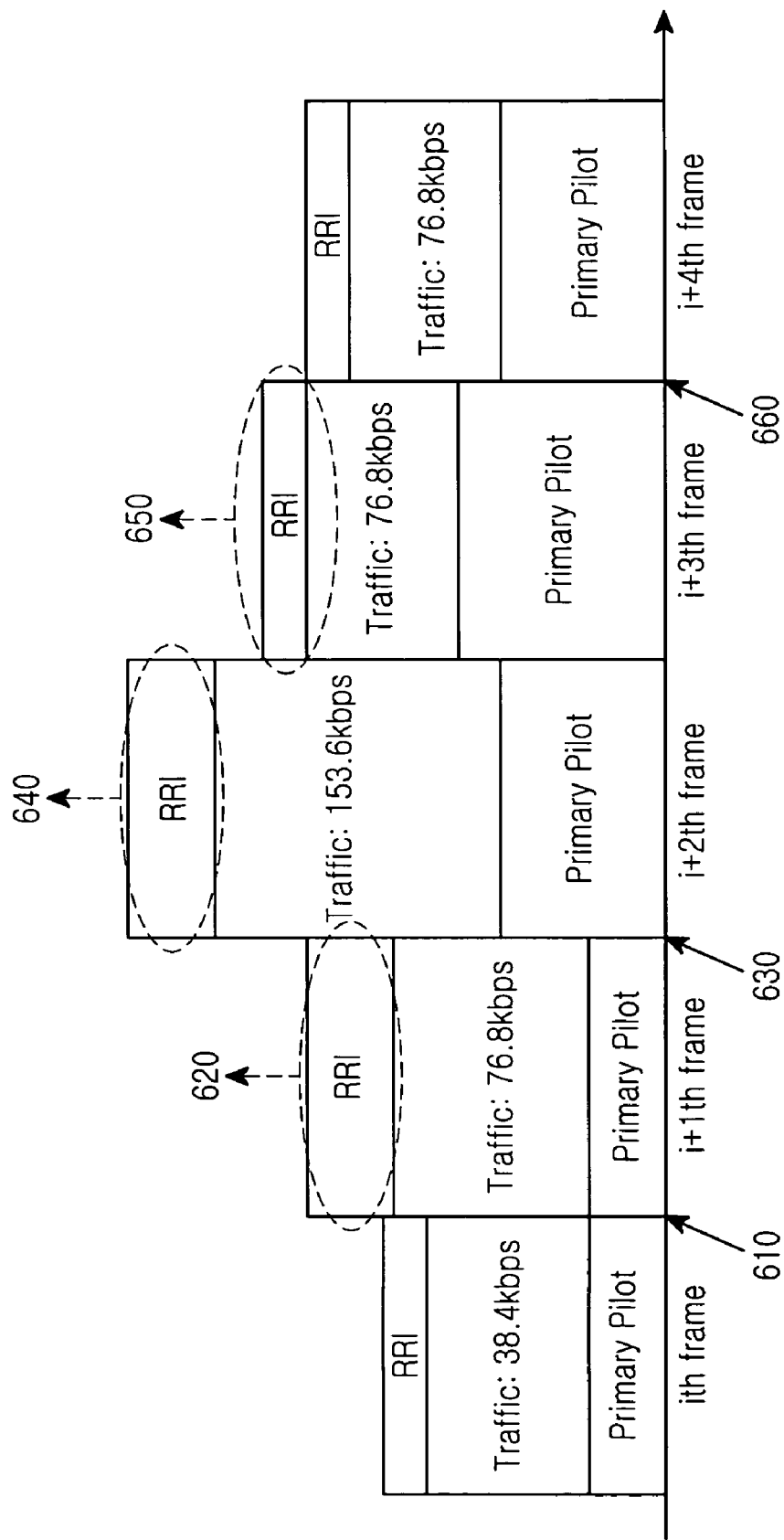
FIG. 6 is a diagram illustrating a reverse power control method performed in a mobile communication system in which a mobile station determines a reverse data rate, according to another embodiment of the present invention.

FIG. 6 is a diagram illustrating a reverse power control method performed in a mobile communication system in which a mobile station determines a reverse data rate, according to another embodiment of the present invention. This embodiment of the present invention is another method for resolving the problem wherein the reception power of a base station becomes less than an appropriate level due to one-frame delay of a power control target setpoint.

Referring to FIG. 6, a mobile station does not transmit a secondary pilot signal at a frame where a data rate is increased from that of the previous frame. For example, the mobile station increases a data rate of an (i+1)$^{th}$ frame from a data rate of an i$^{th}$ frame or the previous frame (Step 610). At the (i+1)$^{th}$ frame, the mobile station increases the transmission power of RRI by the amount of the transmission power of the secondary pilot signal, used in FIG. 3, instead of actually transmitting the secondary pilot signal (Step 620). Then a base station receives RRI of the (i+1)$^{th}$ frame and increases a power control target setpoint for an (i+2)$^{th}$ frame based on the RRI (Step 630).

At the (i+2)$^{th}$ frame, the mobile station increases the data rate from that of the (i+1)$^{th}$ frame or the previous frame, and increases transmission power of the RRI by a difference between the total pilot power needed at the (i+2)$^{th}$ frame and the total transmission power used at the previous frame (Step 640).

In another case, the mobile station decreases a data rate of an (i+3)$^{th}$ frame from that of the (i+2)$^{th}$ frame or the previous frame (Step 650), and uses only the originally used power without increasing transmission power of the RRI.

When the current data rate is increased from the previous data rate as shown in the $(i+1)^{th}$ and $(i+2)^{th}$ frames, transmission power of an RRI channel is determined by $$P_{RRI} = P_{PP} \times \{10^{TPR_{RRI}/10} + 10^{(PREF_{i+1} - PREF_i)/80} - 1\} \tag{8}$$

It is noted from Equation (8) that transmission power of the RRI is determined by a difference between the $TPR_{RRI}$ based on a data rate in a corresponding time period and a pilot reference level occurring due to the increase in the data rate. In addition, In Equation (8), $TPR_{RRI}$ is a value defined to determine transmission power of RRI transmitted at a frame where a data rate thereof is not increased from the previous data rate. At the frame where its data rate is increased from the previous data rate, transmission power of RRI is determined using a difference between the $TPR_{RRI}$ and the pilot reference level as shown in Equation (8).

When the current data rate is not increased from the previous data rate as shown in the $(i+3)^{th}$ frame, transmission power of an RRI channel is determined by $$P_{RRI} = P_{PP} \times 10^{TPR_{RRI}/10} \tag{9}$$

In Equation (8) and Equation (9), $TPR_{RATE}$ denotes a traffic to pilot power ratio, and $TPR_{RRI}$ denotes a ratio of transmission power of an RRI channel to transmission power of a primary pilot signal and is differently set according to a data rate of the traffic channel.

Because only the primary pilot signal is used herein, transmission power of a reverse traffic channel is determined by Equation (2) regardless of an increase in the data rate.

The reason for increasing the transmission power of the RRI, instead of transmitting a secondary pilot signal in the time period where a data rate thereof is increased, is to use RRI for channel compensation instead of using a secondary pilot signal. When transmission power of the RRI is increased, a base station first performs channel compensation on the RRI using a primary pilot signal, decodes the channel-compensated RRI, and sets a sign of a received RRI sequence to '+' using the decoding result. Setting a sign of an RRI sequence is equivalent to extracting channel compensation information, i.e. information on a fading channel, from an RRI sequence by multiplying an estimation sequence based on the decoding result of the received RRI sequence.

The embodiment of the present invention can be applied according to decoding performance of RRI. For example, if it is determined that a decoding error rate of RRI is very low, channel compensation is performed using RRI that is transmitted with increased transmission power.

Figure 7:
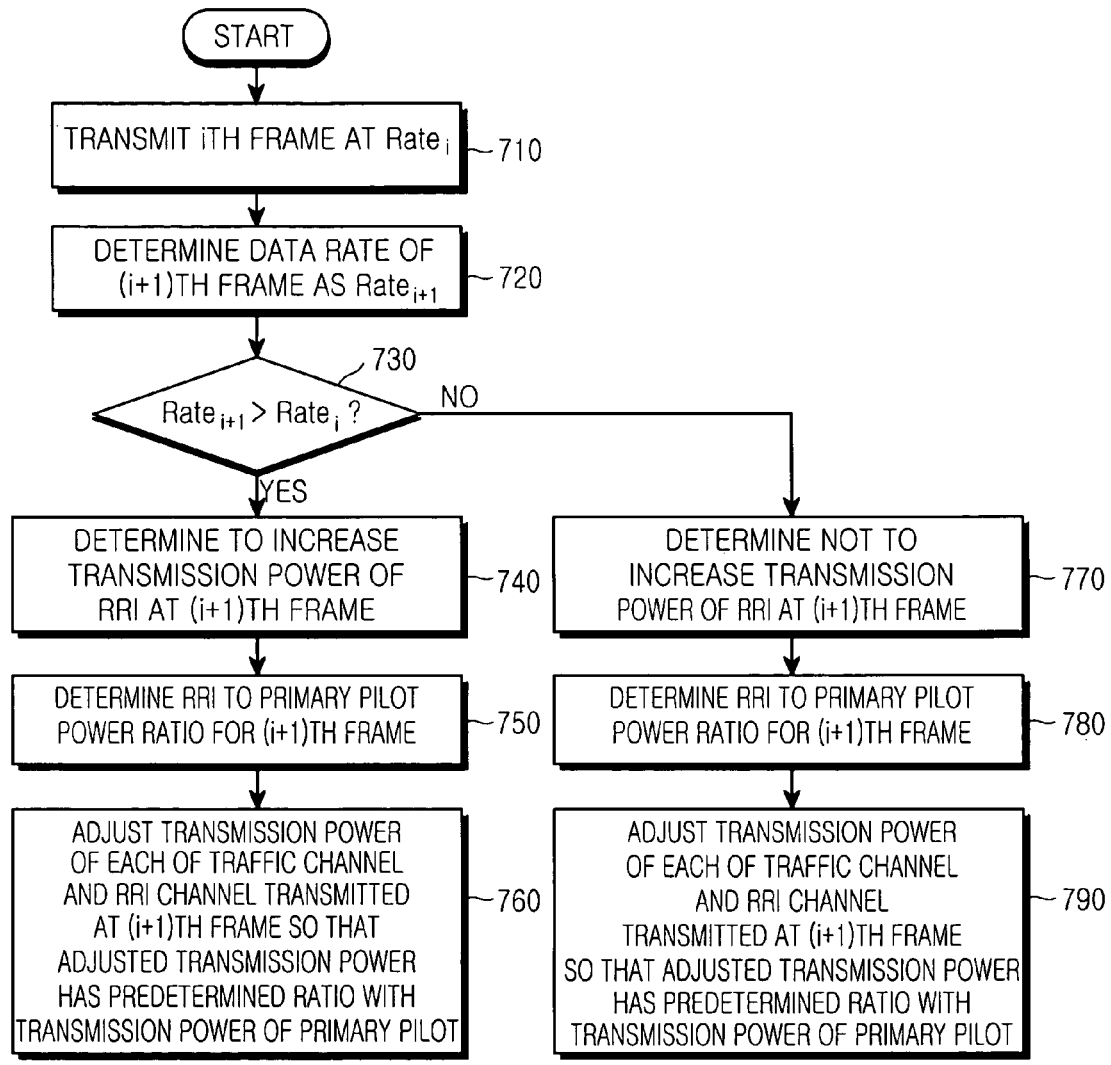
FIG. 7 is a flowchart illustrating a procedure for determining the transmission power of an RRI channel by a mobile station according to another embodiment of the present invention.

FIG. 7 is a flowchart illustrating a procedure for determining transmission power of an RRI channel by a mobile station according to another embodiment of the present invention. Referring to FIG. 7, in step 710, a mobile station transmits traffic data at a data rate $Rate_i$ of a traffic channel at an $i^{th}$ frame. In step 720, the mobile station determines a data rate $Rate_{i+1}$ at an $(i+1)^{th}$ frame. In step 730, the mobile station compares the data rate $Rate_{i+1}$ of the $(i+1)^{th}$ frame with the data rate $Rate_i$ of the $i^{th}$ frame. If the data rate $Rate_{i+1}$ at the $(i+1)^{th}$ frame is greater than the data rate $Rate_i$ at the previous frame, the mobile station determines to increase transmission power of an RRI channel in step 740.

Thereafter, the mobile station determines in step 750 an RRI to primary pilot power ratio at the $(i+1)^{th}$ frame, and determines in step 760 the transmission power of each of the traffic channel and the RRI channel so that the transmission power will have a predetermined ratio with transmission power of the primary pilot channel. The RRI to primary pilot power ratio includes an increment caused by the increase in a data rate, and as a result, the transmission power of the RRI channel is determined by Equation (8).

In contrast, if it is determined that the data rate $Rate_{i+1}$ at the $(i+1)^{th}$ frame is not greater than the data rate $Rate_i$ at the previous frame, the mobile station determines not to increase transmission power of an RRI channel in step 770. Thereafter, the mobile station determines in step 780 an RRI to primary pilot power ratio, and determines in step 790 the transmission power of each of the traffic channel and the RRI channel so that the transmission power will be at a predetermined ratio with the transmission power of the primary pilot channel. Here, the RRI to primary pilot power ratio does not include an increment caused by the increase in a data rate, and as a result, the transmission power of the RRI channel is determined by Equation (9).

Figure 8:
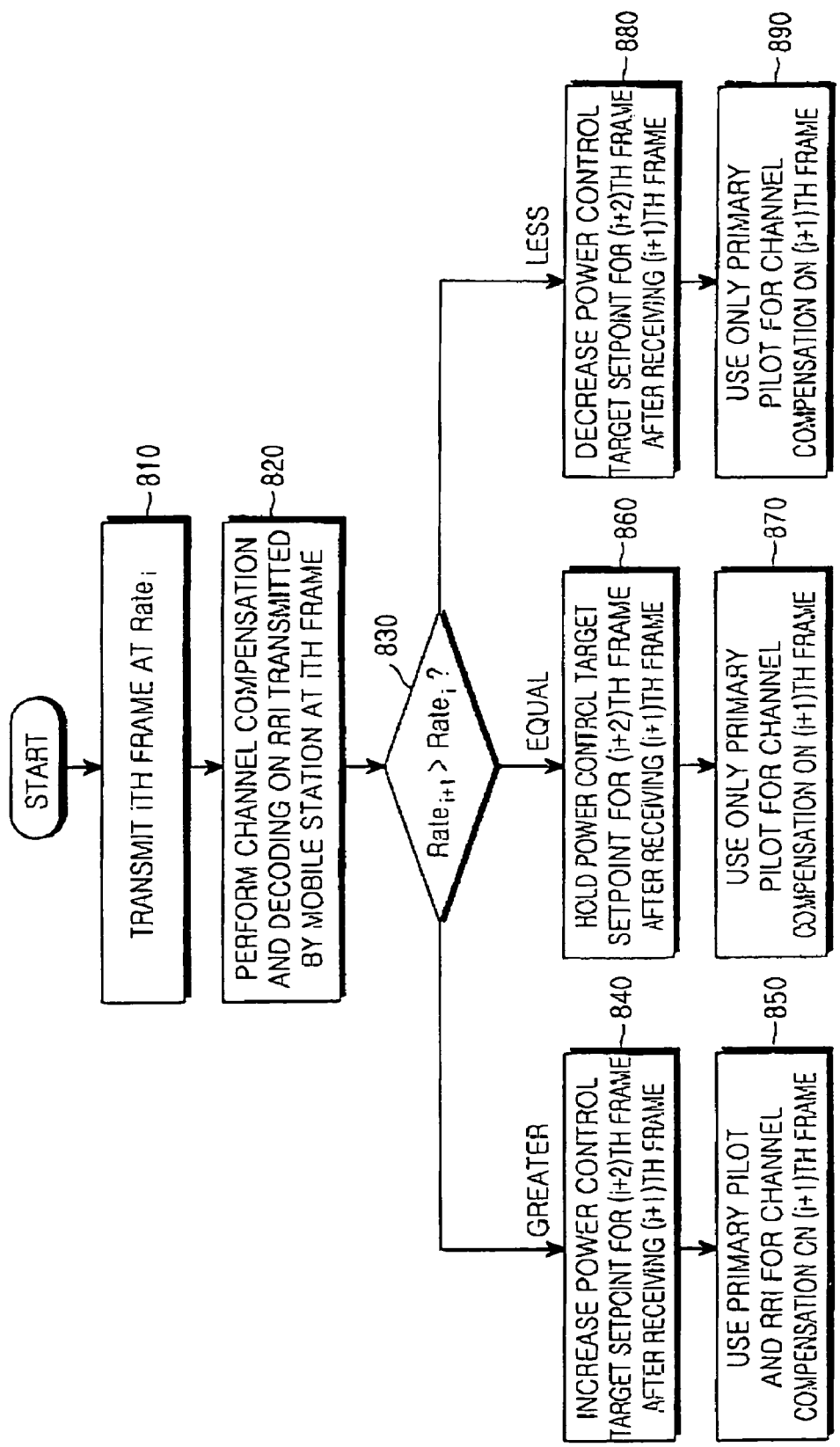
FIG. 8 is a flowchart illustrating a procedure for determining a reverse power control target setpoint and performing channel compensation by a base station according to another embodiment of the present invention.

FIG. 8 is a flowchart illustrating a procedure for determining a reverse power control target setpoint and performing channel compensation by a base station according to another embodiment of the present invention. Referring to FIG. 8, in step 810, the base station receives traffic data that a mobile station has transmitted at a data rate $Rate_i$ at an $i^{th}$ frame. In step 820, the base station detects a data rate used at an $(i+1)^{th}$ frame by channel-compensating RRI received at the $(i+1)^{th}$ frame using a primary pilot signal and then decoding the channel-compensated RRI. In step 830, the base station compares a data rate $Rate_{i+1}$ of the $(i+1)^{th}$ frame transmitted by the mobile station with a data rate $Rate_i$ of the previous frame.

If the $Rate_{i+1}$ is greater than the $Rate_i$, the base station receives the $(i+1)^{th}$ frame data and then increases a power control target setpoint for an $(i+2)^{th}$ frame in step 840. The power control target setpoint is increased in accordance with Equation (6). In step 850, the base station performs channel compensation on the $(i+1)^{th}$ frame using a primary pilot signal and the RRI. The base station uses both the primary pilot signal and the RRI because transmission power of the RRI is increased at a frame where its data rate is increased.

When both the primary pilot signal and the RRI are used for channel compensation, the base station should combine the primary pilot signal with the RRI. The primary pilot signal and the RRI are combined by maximal ratio combining (MRC), and during MRC combining, the gains to individually multiply the primary pilot signal and the RRI by are determined in proportion to transmission power values of the primary pilot signal and the RRI. For example, if a transmission power ratio of the primary pilot signal to the RRI is a:b, the primary pilot signal is multiplied by a gain 'a' and the RRI is multiplied by a gain 'b'.

However, if it is determined in step 830 that the data rate $Rate_{i+1}$ used by the mobile station at the $(i+1)^{th}$ frame is equal to the data rate $Rate_i$ of the previous frame, the base station maintains the power control target setpoint for the $(i+2)^{th}$ frame to be equal to that of the $(i+1)^{th}$ frame in step 860. Thereafter, in step 870, the base station performs channel compensation on a traffic channel of the $(i+1)^{th}$ frame using only the primary pilot signal.

Finally, if it is determined in step 830 that the data rate $Rate_{i+1}$ used by the mobile station at the $(i+1)^{th}$ frame is less than the data rate $Rate_i$ of the previous frame, the base station decreases the power control target setpoint for the $(i+2)^{th}$ frame from that of the $(i+1)^{th}$ frame in step 880. Thereafter, in step 890, the base station performs channel compensation on a traffic channel of the $(i+1)^{th}$ frame using only the primary pilot signal. The decreased power control target setpoint is determined using Equation (7).

The base station can determine a power ratio of the RRI to the primary pilot signal after it detects a data rate of a corresponding frame. In this case, when the RRI is measured and used for inner loop power control, an additional one-frame delay is inevitably needed for power control, causing performance deterioration. Therefore, as described in the first embodiment of the present invention, the base station uses only the primary pilot signal in performing inner loop power control. That is, the base station measures only the primary pilot signal, compares the measured primary pilot signal with the power control target setpoint, and then instructs the mobile station to increase or decrease its transmission power according to the comparison result.

In FIGS. 6, 7 and 8, when a data rate is increased, channel estimation performance is maintained using a method of increasing transmission power of the RRI. In another embodiment of the present invention capable of achieving the similar performance, the RRI transmission power at the frame where its data rate is increased is determined by Equation (10) below instead of Equation (8).

$$P_{RRI} = P_{pp} \times \text{MAX}\{10^{TPR_{RRI}/10}, 10^{(PREF_{i+1}-PREF_i)/80} - 1\} \quad (10)$$

In Equation (10), MAX(a,b) denotes a function for selecting the greater value from 'a' and 'b'. For example, if a>b, 'a' is selected, and in the opposite case, where a<b, 'b' is selected. It is noted from Equation (10) that the RRI transmission power at the frame where its data rate is increased is set to the transmission power of the greater of the transmission power based on $TPR_{RRI}$ and the additional transmission power based on a pilot reference level difference.

The embodiments described above can be applied to a mobile station that adjusts a reverse data rate by one step. An operation of adjusting a reverse data rate by one step is called a rate controlled mode, and the rate controlled mode is distinguishable from a scheduled mode in which a data rate is allowed to be adjusted by two or more steps. In the rate controlled mode, a mobile station increases or decreases a data rate by one step according to the steps of the data rates shown in Table 1 in response to an instruction from a base station. In the scheduled mode, a base station allows a mobile station to change a data rate by two or more steps, and then the mobile station determines its own reverse data rate within a permitted range.

In the scheduled mode, the mobile station should be able to rapidly change its data rate to a lesser data rate after instantaneously transmitting reverse data at a high data rate. However, if the mobile station increases a power control target setpoint according to a data rate after transmitting reverse data at a high data rate, the mobile station must transmit reverse data with the high transmission power even though it has changed its data rate to a lower data rate at the next frame. Therefore, in a further embodiment of the present invention, in the scheduled mode, even though a reverse data rate has been increased, the base station compensates for insufficient power by using a secondary pilot signal without increasing the power control target setpoint.

Figure 9:
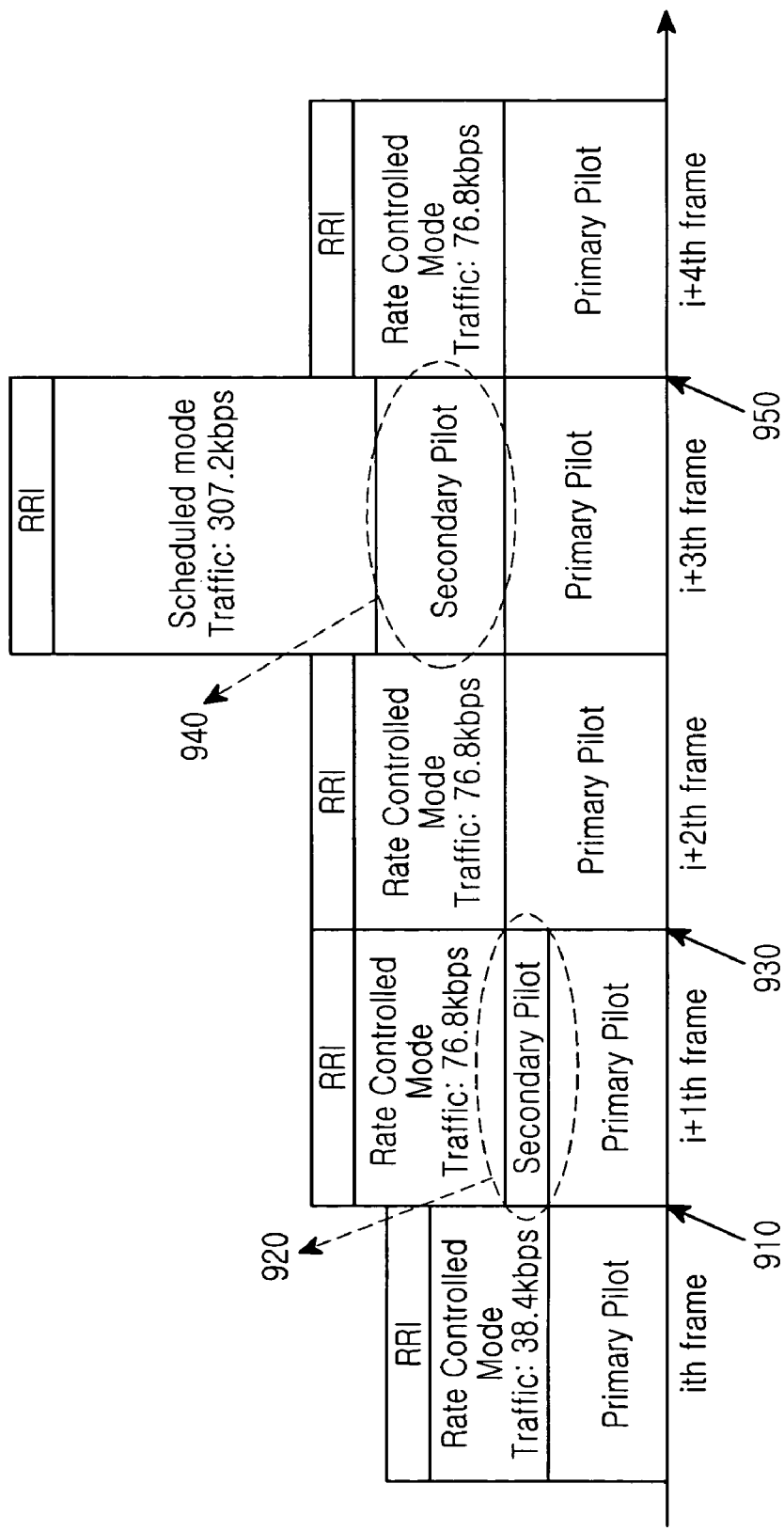
FIG. 9 is a diagram illustrating a reverse power control method performed in a mobile communication system in which a mobile station or a base station determines a reverse data rate, according to further another embodiment of the present invention.

FIG. 9 is a diagram illustrating a reverse power control method performed in a mobile communication system in which a mobile station or a base station determines a reverse data rate, according to a further embodiment of the present invention, and is a further method for resolving the problem where a base station's reception power becomes less than an appropriate level due to the one-frame delay of a power control target setpoint.

Referring to FIG. 9, the scheduled mode is not allowed in $i^{th}$ to $(i+2)^{th}$ frames. A mobile station uses a data rate of 38.4 kbps at the $i^{th}$ frame, and increases the data rate to 76.8 bkps by one step according to the rate controlled mode at the $(i+1)^{th}$ frame (Step 910). When the data rate is increased in this way, the mobile station transmits a secondary pilot signal with the additional power necessary for performing efficient channel compensation, taking into consideration that the power control by a base station will be performed with a delay of one frame (Step 920). The secondary pilot signal has the power corresponding to a difference between total pilot power necessary for receiving the $(i+1)^{th}$ frame at 76.8 kbps by the base station and the primary pilot signal power.

If the base station perceives that the data rate used at the $(i+1)^{th}$ frame is greater than the data rate of the previous frame, the mobile station first receives an $(i+1)^{th}$ RRI and then increases a power control target setpoint (Step 930). In this case, the base station performs channel compensation using both a primary pilot signal and a secondary pilot signal. At the $(i+2)^{th}$ frame, the secondary pilot signal is not transmitted, because the data rate of 76.8 kbps used at the $(i+2)^{th}$ frame is equal to the data rate of the previous frame.

When the base station allows the scheduled mode for an $(i+3)^{th}$ frame, the mobile station increases at the $(i+3)^{th}$ frame the data rate to, for example, 307.2 kbps by two steps, and transmits a secondary pilot signal with the power corresponding to a difference between the total pilot power necessary for 307.2 kbps and the primary pilot power (Step 940).

At an $(i+4)^{th}$ frame, because the base station already knows that the mobile station used a scheduled mode at the previous mode, the base station does not increase a power control target setpoint even though it perceives that a data rate of the $(i+4)^{th}$ frame has been increased from the data rate of the $(i+3)^{th}$ frame or the previous frame (Step 950). The power control target setpoint is adjusted after the RRI of the $(i+4)^{th}$ frame is received.

When the scheduled mode is used, an operation of transmitting a primary pilot signal and a secondary pilot signal by the mobile station is identical to the operation described in connection with FIG. 4. That is, when the mobile station determined to increase the data rate by one or more steps, the mobile station transmits a secondary pilot signal with the necessary power to compensate for the increased data rate. The transmission power of the secondary pilot signal is determined by determining a difference between a pilot reference level for a previous data rate and a pilot reference level for a current data rate.

Figure 10:
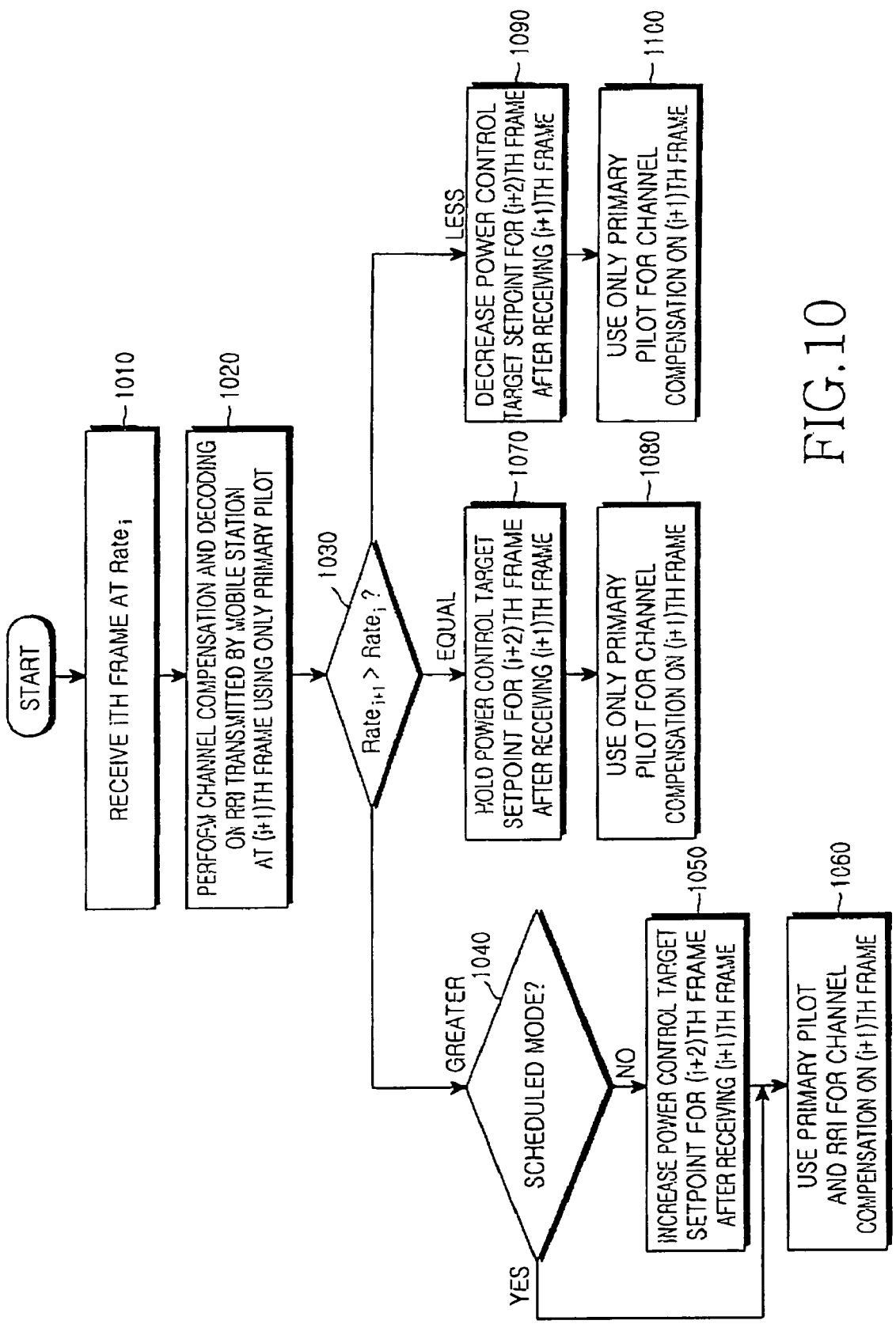
FIG. 10 is a flowchart illustrating a procedure for determining a reverse power control target setpoint and performing channel compensation according to further another embodiment of the present invention.

FIG. 10 is a flowchart illustrating a procedure for determining a reverse power control target setpoint and performing channel compensation according to a further embodiment of the present invention. Referring to FIG. 10, in step 1010, the base station receives traffic data that a mobile station has transmitted at a data rate $Rate_i$ at an $i^{th}$ frame. In step 1020, the base station detects a data rate $Rate_{i+1}$ used at an $(i+1)^{th}$ frame by channel-compensating the RRI received at the $(i+1)^{th}$ frame with a primary pilot signal and then decoding the channel-compensated RRI. In step 1030, the base station compares the data rate $Rate_{i+1}$ with a data rate $Rate_i$ of the previous frame.

If the $Rate_{i+1}$ is greater than the Rates, the base station determines in step 1040 whether or not the scheduled mode was used in the $(i+1)^{th}$ frame. Whether or not the scheduled mode was used can be determined based on whether or not the base station has allowed the mobile station to adjust the data rate by two or more steps for the $(i+1)^{th}$ frame. This is because in order to use the scheduled mode, the mobile station should be allowed by the base station to adjust the data rate by two or more steps.

If it is determined in step 1040 that the scheduled mode was allowed, the base station proceeds to step 1060 where it performs a channel compensation on the $(i+1)^{th}$ frame using both the primary pilot signal and the secondary pilot signal without adjusting a power control target setpoint.

In contrast, if it is determined in step 1040 that the scheduled mode was not allowed, the base station proceeds to step 1050 where it increases a power control target setpoint for the $(i+2)^{th}$ frame, and then proceeds to step 1060 where it performs channel compensation on the $(i+1)^{th}$ frame using both the primary pilot signal and the secondary pilot signal. The power control target setpoint is increased in accordance with Equation (6).

However, if it is determined in step 1030 that the data rate $Rate_{i+1}$ used by the mobile station at the $(i+1)^{th}$ frame is equal to the data rate $Rate_i$ of the previous frame, the base station maintains the power control target setpoint for the $(i+2)^{th}$ frame to be equal to that of the $(i+1)^{th}$ frame in step 1070. Thereafter, in step 1080, the base station performs channel compensation on a traffic channel of the $(i+1)^{th}$ frame using only the primary pilot signal.

Finally, if it is determined in step 1030 that the data rate $Rate_{i+1}$ of the $(i+1)^{th}$ frame is less than the data rate $Rate_i$ of the previous frame, the base station determined the power control target setpoint for the $(i+2)^{th}$ frame from that of the $(i+1)^{th}$ frame in step 1090. Thereafter, in step 1100, the base station performs channel compensation on a traffic channel of the $(i+1)^{th}$ frame using only the primary pilot signal. The decreased power control target setpoint is decreased using Equation (7).

In the embodiments described above, when a data rate of a mobile station is changed, an RRI to pilot power ratio $TPR_{RRI}$ is determined by Equation (3) or Equation (4) so that reception power of the RRI channel is constant. When a power control target setpoint is adjusted based on whether the RRI is received, reception performance of the RRI is very important. In particular, when the mobile station increases the current data rate from the previous data rate, the base station must receive the RRI without error in order to appropriately adjust the power control target setpoint and maintain a constant reception performance of a traffic channel.

In an exemplary method for reducing a reception error rate of RRI when a mobile station increases a current data rate of a transmission traffic channel from a previous data rate, the $TPR_{RRI}$ is determined such that reception power of an RRI channel is increased when the current data rate is increased from the previous data rate. For example, if 38.4 kbps is used at an $i^{th}$ frame and 76.8 kbps is used at an $(i+1)^{th}$ frame or the next frame, the mobile station determines transmission power of an RRI channel using Equation (11) below at the $(i+1)^{th}$ frame.

$$P_{RRI}=(P_{pp}+P_{sp})\times 10^{(TPR_{RRI}+\Delta)/10} \qquad (11)$$

In Equation (11), Δ has a value previously determined by a system designer such that it is greater than or equal to 0. At the frame where its data rate is increased, the RRI transmission power determined in accordance with Equation (11) is greater by Δ than the RRI transmission power determined in accordance with Equation (3). When the transmission power is increased in this way, reception power of the base station is also increased, resulting in an improvement of the RRI reception performance in the time period where the data rate is increased.

In order to improve the RRI reception performance even when the data rate is decreased, transmission power of an RRI channel is determined by $$P_{RRI}=P_{pp}\times 10^{(TPR_{RRI}+\Delta)/10} \qquad (12)$$

The RRI transmission power determined by Equation (12) is greater by Δ than the RRI transmission power determined by Equation (4), resulting in an improvement of the RRI reception performance.

Figure 11:
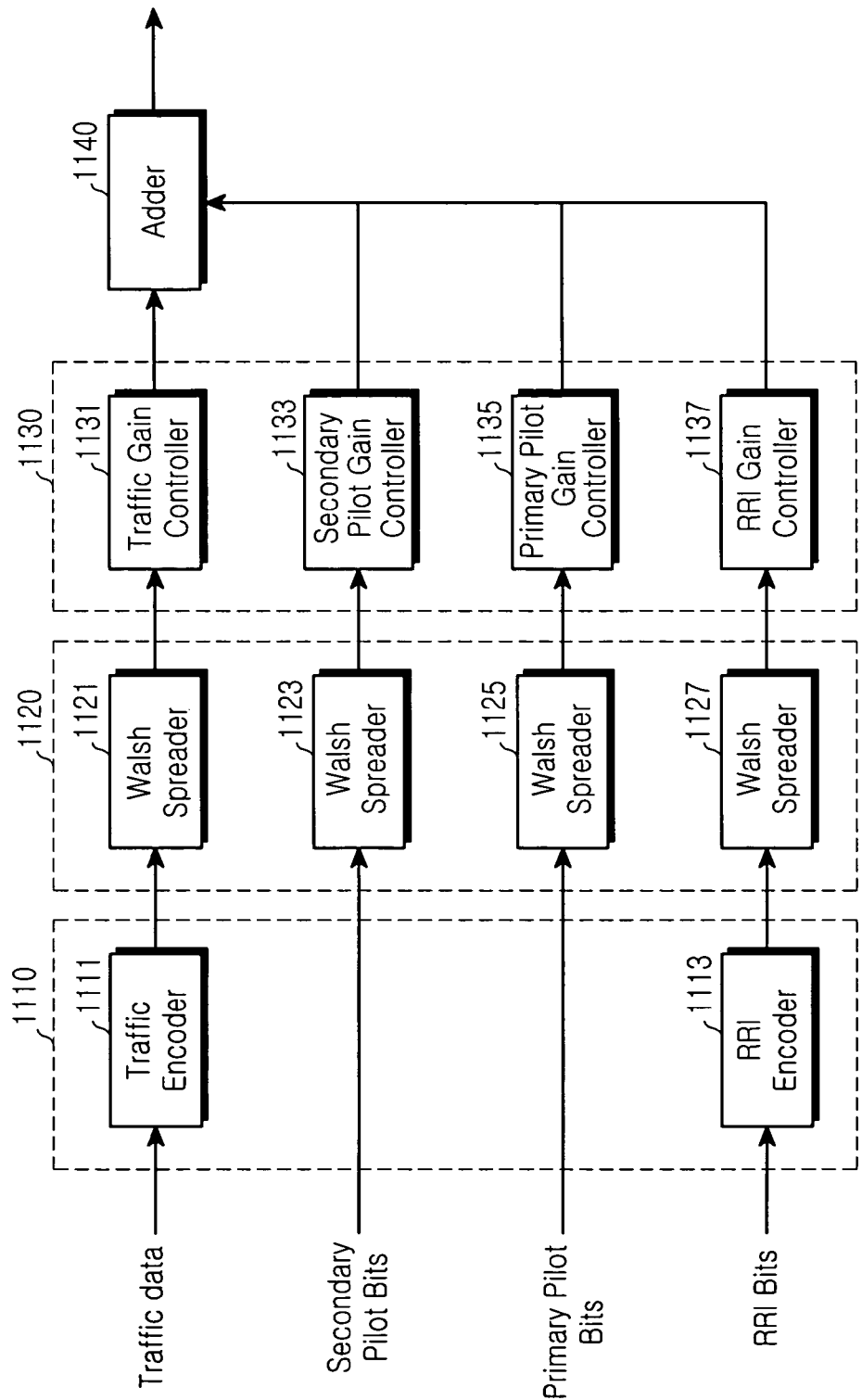
FIG. 11 is a block diagram illustrating an internal structure of a mobile station transmitter to which a reverse power control method according to an embodiment of the present invention is applied.
Figure 12:
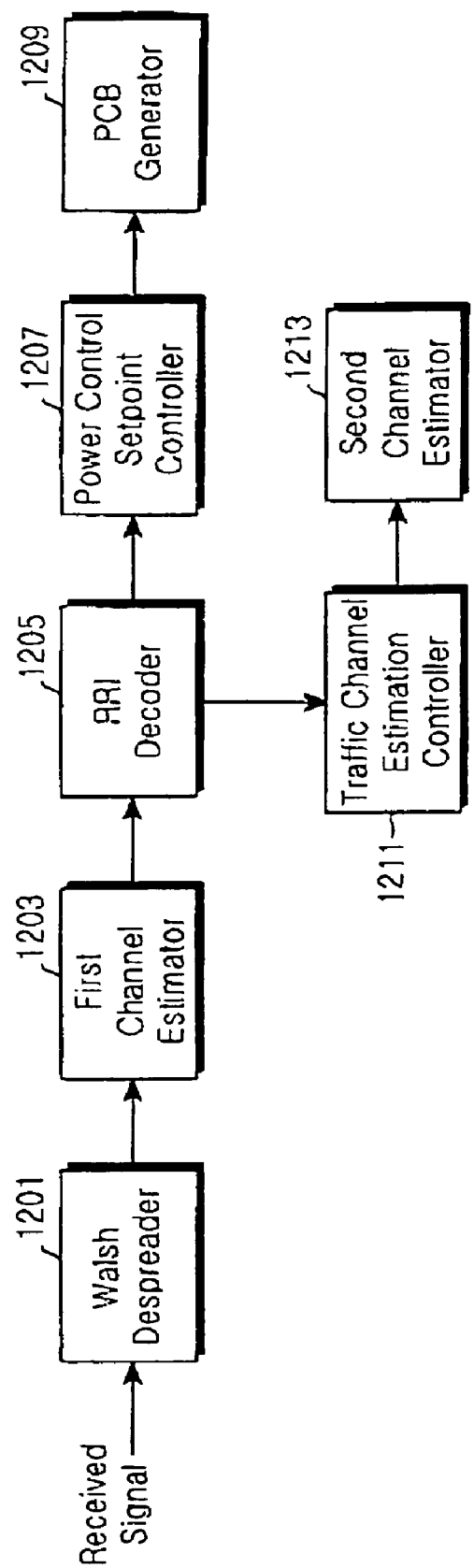
FIG. 12 is a block diagram illustrating a structure of a base station's receiver to which a reverse power control method according to an embodiment of the present invention is applied.

With reference to FIGS. 11 and 12, a description will now be made of structures of a mobile station transmitter and a base station receiver to which the new reverse power control method is applied in a mobile communication system in which a mobile station determines a reverse data rate. Although the structures of FIGS. 11 and 12 are so designed as to support a CDMA standard by way of example, they can also be designed to support other communication standards.

FIG. 11 is a block diagram illustrating an internal structure of a mobile station transmitter to which a reverse power control method according to an embodiment of the present invention is applied. The mobile station transmitter is so designed as to transmit reverse traffic channel data, RRI channel data, and a primary pilot and/or a secondary pilot to a base station in the methods described in connection with FIGS. 3, 6 and 9.

Referring to FIG. 11, the mobile station transmitter includes an encoding section 1110, a spreading section 1120, a transmission power controller 1130, and an adder 1140.

The encoding section 1110 includes a traffic encoder 1111 and an RRI encoder 1113. The traffic encoder 1111 receives reverse data transmitted over a reverse traffic channel, and channel-encodes the received reverse data. The RRI encoder 1113 receives traffic control information (or RRI channel information) such as a data rate and the number of transmission bits of reverse data transmitted at a corresponding frame, and channel-encodes the received RRI channel information.

The spreading section 1120 includes a plurality of known Walsh spreaders 1121, 1123, 1125 and 1127 for orthogonally spreading received reverse data, secondary and/or primary pilot signal bits, and traffic control information (RRI bits) using corresponding Walsh codes. The reverse data and the RRI channel signal are channel-encoded by the traffic encoder 11 and the RRI encoder 1113, respectively, before being orthogonally spread.

Outputs of the spreading section 1120 are input to a transmission power controller 1130 that controls gains of reverse data, secondary and/or pilot signals, and an RRI channel signal, The transmission power controller 1130 controls transmission power gains of the respective input signals in one of the methods described in conjunction with FIGS. 3, 6 and 9.

The transmission power controller 1130 includes a traffic gain controller 1131, secondary and/or primary pilot gain controllers 1133 and 1135, and an RRI gain controller 1137, and provides gain-controlled output signals to the adder 1140. The reverse data, secondary and/or primary pilot signals, and RRI channel signal, gain-controlled by the transmission power controller 1130, are added by the adder 1140, and then transmitted to a base station via an undepicted radio frequency (RF) module and a radio network.

An operation of the mobile station transmitter described above will now be separately described with reference to the reverse power control methods of FIGS. 3, 6 and 9.

Reverse Power Control by Secondary Pilot Signal

In the reverse power control method of FIG. 3, if a data rate of a current frame for reverse data is greater than a data rate of a previous frame, a mobile station transmits to a base station a secondary pilot signal having transmission power corresponding to a difference between a pilot reference level matched to a data rate of the current frame and a pilot reference level matched to a data rate of the previous frame, together with a primary pilot signal, and the base station performs channel compensation on a traffic channel of a corresponding frame with summed power of the received primary and secondary pilot signals.

In the case of the method of FIG. 3, the Walsh spreader 1123 spreads the secondary pilot signal bits, and the secondary pilot gain controller 1133 adjusts the transmission power of the secondary pilot signal by a difference between a pilot reference level for the current frame and a pilot reference level for the previous frame.

At the same time, reverse data of the current frame is encoded and spread by the traffic encoder 1111 and the Walsh spreader 1121, and the traffic gain controller 1131 adjusts a transmission power gain of the reverse data so that transmission power of the reverse data has a predetermined ratio with the total transmission power of the primary pilot signal and the secondary pilot signal. In addition, an RRI channel signal of the current frame is encoded and spread by the RRI encoder 1113 and the Walsh spreader 1127, and the RRI gain controller 1137 adjusts a transmission power gain of the RRI channel signal so that the transmission power of the RRI channel signal has a predetermined ratio with the total transmission power of the primary pilot signal and the secondary pilot signal.

However, if a data rate of the current frame for the reverse data is less than or equal to a data rate of the previous frame, the mobile station transmits a primary pilot signal having a transmission power corresponding to a pilot reference level for a current data rate to the base station, instead of transmitting a secondary pilot signal, and the base station performs channel compensation on a traffic channel of a corresponding frame with the power of the received primary pilot signal. In this case, reverse data of the current frame is encoded and spread by the traffic encoder 1111 and the Walsh spreader 1121, and the traffic gain controller 1131 adjusts a transmission power gain of the reverse data so that transmission power of the reverse data has a predetermined ratio with the transmission power of the primary pilot signal.

In addition, an RRI channel signal of the current frame is encoded and spread by the RRI encoder 1113 and the Walsh spreader 1127, and the RRI gain controller 1137 adjusts a transmission power gain of the RRI channel signal so that the transmission power of the RRI channel signal has a predetermined ratio with the transmission power of the primary pilot signal. Further, if a data rate of the current frame for the reverse data is less than or equal to a data rate of the previous frame as stated above, the operation of spreading a secondary pilot signal and controlling a gain by the secondary pilot gain controller 1133 is suspended.

Reverse Power Control by RRI Channel Signal

In the reverse power control method of FIG. 6, if a data rate of a current frame for reverse data is greater than a data rate of a previous frame, a mobile station transmits to a base station an RRI channel signal having additional transmission power corresponding to a difference between a pilot reference level for the data rate of the current frame and a pilot reference level for the data rate of the previous frame, together with a primary pilot signal, and the base station performs channel compensation on a traffic channel of a corresponding frame with summed power of the received primary signal and the RRI channel signal.

In case of the method of FIG. 6, the RRI channel signal of the current frame is encoded and spread by the RRI encoder 1113 and the Walsh spreader 1127, and the RRI gain controller 1137 additionally increases the transmission power corresponding to a difference between a pilot reference level for the data rate of the current frame and a pilot reference level for the data rate of the previous frame. At this same time, reverse data of the current frame is encoded and spread by the traffic encoder 1111 and the Walsh spreader 1121, and the traffic gain controller 1131 adjusts a transmission power gain of the reverse data so that transmission power of the reverse data has a predetermined ratio with the transmission power of the primary pilot signal.

If a data rate of the current frame for the reverse data is less than or equal to a data rate of the previous frame, the mobile station transmits a primary pilot signal having transmission power corresponding to a pilot reference level for a current data rate to the base station without increasing transmission power of an RRI channel, and the base station performs channel compensation on a traffic channel with the power of the received primary pilot signal. In this case, reverse data of the current frame is encoded and spread by the traffic encoder 1111 and the Walsh spreader 1121, and the traffic gain controller 1131 adjusts a transmission power gain of the reverse data so that transmission power of the reverse data has a predetermined ratio with the transmission power of the primary pilot signal.

In addition, traffic control information of the current frame is encoded and spread by the RRI encoder 1113 and the Walsh spreader 1127, and the RRI gain controller 1137 adjusts a transmission power gain of the RRI channel signal so that transmission power of the RRI channel signal has a predetermined ratio with the transmission power of the primary pilot signal. Further, if a data rate of the current frame for the reverse data is less than or equal to a data rate of the previous frame as stated above, the gain control operation on the RRI channel signal by the RRI gain controller 1137 is suspended.

Because the mobile station transmitter described above does not require a secondary pilot signal for reverse power control, the Walsh spreader 1123 and the secondary pilot gain controller 1133 can be omitted.

Reverse Power Control by Scheduled Mode

In the reverse power control method of FIG. 9, if an amount of reverse traffic of a mobile station is abruptly increased and an instruction allowing the mobile station to increase a data rate by two or more steps based on, for example, the scheduled mode is received from a base station, the mobile station performs power control in the reverse power control method of FIG. 3, wherein the mobile station increases the transmission power of a secondary pilot signal as high as the increased data rate and transmits reverse data with the increased transmission power. In this regard, the transmission power controller 1130 of FIG. 11 adjusts transmission power of a secondary pilot signal through the traffic gain controller 1131 and the secondary pilot gain controller 1133 by receiving an approval for the scheduled mode from the base station.

In the reverse power control by the scheduled mode according to the present invention, an increase in a data rate of two or more steps occurs between consecutive frames, and transmission power of the secondary pilot signal is increased as high as the increase in the data rate. This is performed in the reverse power control method of FIG. 9, and since the reverse power control method of FIG. 9 is similar in operation to the reverse power control method of FIG. 3, a detailed description thereof will be omitted.

FIG. 12 is a block diagram illustrating a structure of a base station receiver to which a reverse power control method according to an embodiment of the present invention is applied. The base station receiver receives the reverse traffic channel, the RRI channel data, and the primary pilot and/or secondary pilot signals transmitted in the methods of FIGS. 3, 6 and 9, and adjusts a power control target setpoint for the outer loop power control.

In order to appropriately receive the reverse traffic channel signal transmitted in the methods of FIGS. 3, 6 and 9, the base station must preferentially perform reception and decoding operations on an RRI channel signal which includes traffic control information such as a data rate and the number of transmission bits of reverse data, before a process of receiving the reverse traffic channel signal. In this regard, a Walsh despreader 1201 despreads an RRI channel signal received via a radio network in a known method using a Walsh code, and a first channel estimator 1203 performs channel compensation on the despread RRI channel signal using a primary pilot signal and provides its output to an RRI decoder 1205.

The RRI decoder 1205 decodes traffic control information carried by the RRI channel and provides the decoded traffic control information to a power control setpoint controller 1207 and a traffic channel estimation controller 1211. The power control setpoint controller 1207 determines whether or not to increase, decrease or hold a power control target setpoint in the reverse power control methods of FIGS. 3, 6 and 9 using the traffic control information carried by the RRI, and provides the determined power control target setpoint information to a power control bit (PCB) generator 1209.

The traffic channel estimation controller 1211 determines whether to perform channel compensation on the reverse traffic channel using the traffic control information provided from the RRI decoder 1205. If it is determined that channel compensation is necessary, i.e., if a data rate of the current frame is greater than a data rate of the previous frame, the traffic channel estimation controller 1211 controls a second channel estimator 1213 so that the second channel estimator 1213 performs channel compensation on a reverse traffic channel. The channel compensation on the traffic channel by the traffic channel estimation controller 1211 is achieved in the reverse power control methods of FIGS. 3, 6 and 9 using the presence of a secondary pilot and a secondary pilot to primary pilot power ratio, or an RRI channel signal.

As can be understood from the foregoing description, a pilot signal having transmission power fitted to receive data on a reverse traffic channel transmitted by a mobile station is used to improve reverse traffic reception performance of a base station. In addition, as the mobile station changes a data rate, transmission power of a primary pilot signal and/or a secondary pilot signal is appropriately adjusted to optimize transmission power of the primary pilot signal and the secondary pilot signal, necessary for power control and channel estimation on a reverse traffic channel.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for controlling by a mobile station transmission power of a reverse channel in a mobile communication system, the method comprising the steps of:
    determining a data rate of a reverse traffic channel for each frame;
    comparing a first data rate of a current frame with a second data rate of a previous frame;
    if the first data rate is greater than the second data rate, transmitting to a base station a signal on a primary pilot channel having transmission power corresponding to a pilot reference level of the second data rate and a signal on a secondary pilot channel for reverse channel compensation;
    if the first data rate is less than or equal to the second data rate, transmitting a signal on the primary pilot channel among signals on the pilot channels; and
    if the first data rate is less than or equal to the second data rate, determining a transmission power of each of the reverse traffic channel and a reverse rate indicator (RRI) channel so that the determined transmission power has a predetermined ratio with transmission power of the primary pilot channel, and transmitting a signal on the reverse traffic channel and a signal on the RRI channel at the determined transmission power.

2. The method of claim 1, wherein the secondary pilot channel has transmission power corresponding to a difference between the pilot reference level of the first data rate and the second data rate.

3. The method of claim 1, wherein the pilot reference level is determined in proportion to the first and second data rates.

4. The method of claim 1, wherein the transmission power of the secondary pilot channel is determined by $$P_{sp}=P_{pp}\times\{10^{(PREF_{i+1}-PREF_i)/80}-1\}$$

where $P_{sp}$ denotes transmission power of the secondary pilot channel, $P_{pp}$ denotes transmission power of the primary pilot channel, and $PREF_i$ and $PREF_{i+1}$ denote pilot reference levels for data rates of the previous frame and the current frame, respectively.

5. The method of claim 1, further comprising the step of, if the first data rate is greater than the second data rate, determining a transmission power of each of the reverse traffic channel and the reverse rate indicator (RRI) channel so that the transmission power has a predetermined ratio with the total transmission power of the primary pilot channel and the secondary pilot channel, and transmitting a signal on the reverse traffic channel and a signal on the RRI channel at the determined transmission power.

6. The method of claim 5, wherein the transmission power of the reverse traffic channel is determined by $$P_{TRCH}=(P_{pp}+P_{sp})\times 10^{TPR_{RATE}/10}$$

where $P_{TRCH}$ denotes transmission power of the reverse traffic channel, $P_{pp}$ denotes transmission power of the primary pilot channel, $P_{sp}$ denotes transmission power of the secondary pilot channel, and $TPR_{RATE}$ denotes a traffic to pilot power ratio previously uniquely set for each data rate.

7. The method of claim 5, wherein the transmission power of the RRI channel is determined by $$P_{RRI}=(P_{pp}+P_{sp})\times 10^{TPR_{RRI}/10}$$

where $P_{RRI}$ denotes transmission power of the RRI channel, $P_{pp}$ denotes transmission power of the primary pilot channel, $P_{sp}$ denotes transmission power of the secondary pilot channel, and $TPR_{RRI}$ denotes an RRI to pilot power ratio previously uniquely set for each data rate.

8. The method of claim 1, wherein the transmission power of the reverse traffic channel is determined by $$P_{TRCH}=P_{pp}\times 10^{TPR_{RATE}/10}$$

where $P_{TRCH}$ denotes transmission power of the reverse traffic channel, $P_{pp}$ denotes transmission power of the primary pilot channel, and $TPR_{RATE}$ denotes a traffic to pilot power ratio previously uniquely set for each data rate.

9. The method of claim 1, wherein the transmission power of the RRI channel is determined by $$P_{RRI}=P_{pp}\times 10^{TPR_{RRI}/10}$$

where $P_{RRI}$ denotes transmission power of the RRI channel, $P_{pp}$ denotes transmission power of the primary pilot channel, and TPR$_{RRI}$ denotes an RRI to pilot power ratio previously uniquely set for each data rate.

10. A method for controlling by a mobile station transmission power of a reverse channel in a mobile communication system, the method comprising the steps of:
   determining a data rate of a reverse traffic channel for each frame;
   comparing a first data rate of a current frame with a second data rate of a previous frame;
   if the first data rate is greater than the second data rate as a result of the comparison, transmitting to a base station a signal on a primary pilot channel having transmission power corresponding to a pilot reference level of the second data rate and a signal on a reverse rate indicator (RRI) channel having transmission power higher than transmission power of an reverse rate indicator (RRI) channel transmitted at the previous frame;
   if the first data rate is less than or equal to the second data rate, transmitting a signal on the primary pilot channel among signals on the pilot channels; and
   if the first data rate is less than or equal to the second data rate, determining a transmission power of each of the reverse traffic channel and the (RRI) channel so that the determined transmission power has a predetermined ratio with transmission power of the primary pilot channel, and transmitting a signal on the reverse traffic channel and a signal on the RRI channel at the determined transmission power.

11. The method of claim 10, wherein the RRI channel has transmission power corresponding to a difference between the pilot reference level of the first data rate and the second data rate.

12. The method of claim 10, wherein the pilot reference level is determined in proportion to the first and second data rates.

13. The method of claim 10, wherein the transmission power of the RRI channel is determined by $$P_{RRI}=P_{pp} \times \{10^{TPR_{RRI}/10}+10^{(PREF_{i+1}-PREF_i)/80}-1\}$$

where P$_{RRI}$ denotes transmission power of the RRI channel, P$_{pp}$ denotes transmission power of the pilot channel, TPR$_{RRI}$ denotes an RRI to pilot power ratio uniquely set for each data rate, and PREF$_i$ and PREF$_{i+1}$ denote pilot reference levels for data rates at which the previous frame and the current frame are transmitted, respectively.

14. The method of claim 10, wherein the transmission power of the RRI channel is determined by $$P_{RRI}=P_{pp} \times MAX\{10^{TPR_{RRI}/10}, 10^{(PREF_{i+1}-PREF_i)/80}-1\}$$

where P$_{RRI}$ denotes transmission power of the RRI channel, P$_{pp}$ denotes transmission power of the pilot channel, MAX(a, b) denotes a function of selecting a greater value from 'a' and 'b', TPR$_{RRI}$ denotes an RRI to pilot power ratio uniquely set for each data rate, and PREF$_i$ and PREF$_{i+1}$ denote pilot reference levels for data rates at which the previous frame and the current frame are transmitted, respectively.

15. The method of claim 10, further comprising the step of transmitting a signal on the RRI channel with constant transmission power, if the first data rate is less than or equal to the second data rate.

16. The method of claim 15, wherein the transmission power of the RRI channel is determined by $$P_{RRI}=P_{pp} \times 10^{(TPR_{RRI})/10}$$

where P$_{RRI}$ denotes transmission power of the RRI channel, P$_{pp}$ denotes transmission power of the pilot channel, and TPR$_{RRI}$ denotes an RRI to pilot power ratio uniquely set for each data rate.

17. The method of claim 10, further comprising the step of determining transmission power of the reverse traffic channel so that the transmission power has a predetermined ratio with transmission power of the pilot channel, and transmitting on the reverse traffic channel a signal—at the determined transmission power.

18. The method of claim 17, wherein the transmission power of the reverse traffic channel is determined by $$P_{TRCH}=P_{pp} \times 10^{TPR_{RATE}/10}$$

where P$_{TRCH}$ denotes transmission power of the reverse traffic channel, P$_{pp}$ denotes transmission power of the pilot channel, and TPR$_{RATE}$ denotes a traffic to pilot power ratio previously uniquely set for each data rate.

19. A mobile station transmission apparatus for controlling transmission power of a reverse channel in a mobile communication system, the apparatus comprising:
   an encoding section for channel-encoding reverse data transmitted over a reverse traffic channel and a signal on a reverse rate indicator (RRI) channel indicating reverse data rate; and
   a transmission power controller for receiving a signal on a secondary pilot channel that is optionally transmitted according to the encoded reverse data and RRI channel signal, a signal on a primary pilot channel, and an increase in the reverse data rate of the mobile station, comparing a first data rate of a current frame with a second data rate of a previous frame, and adjusting a transmission power gain of the signals according to the comparison result,
   wherein when the first data rate is greater than the second data rate, the transmission power controller determines transmission power of each of the reverse traffic channel and the RRI channel so that the determined transmission power has a predetermined ratio with the total transmission power of the primary pilot channel and the secondary pilot channel, and controls gains of the reverse traffic channel signal and the RRI channel signal according the determined transmission power.

20. The mobile station transmission apparatus of claim 19, wherein if the first data rate is greater than the second data rate as a result of the comparison, the transmission power controller outputs a signal on the primary pilot channel having transmission power corresponding a pilot reference level for the second data rate, and increases a gain of a signal on the secondary pilot channel so that the secondary pilot channel has transmission power corresponding to a difference between a pilot reference level for the first data rate and a pilot reference level for the second data rate.

21. The mobile station transmission apparatus of claim 19, wherein if the first data rate is less than or equal to the second data rate, the transmission power controller outputs only a signal on the primary pilot channel having transmission power corresponding to a pilot reference level for the second data rate among signals on the pilot channels.

22. The mobile station transmission apparatus of claim 19, wherein if the first data rate is less than or equal to the second data rate, the transmission power controller adjusts a transmission power gain of each of the reverse traffic channel and the RRI channel so that the transmission power has a predetermined ratio with transmission power of the primary pilot channel.

23. The mobile station transmission apparatus of claim 19, wherein if a ratio of the second data rate to the first data rate is greater than a predetermined ratio, the transmission power controller selects a scheduled mode to determine a data rate of the reverse traffic channel, and increases a transmission power gain of a signal on the secondary pilot channel by a difference in pilot reference level between the first data rate and the second data rate.

24. A mobile station transmission apparatus for controlling transmission power of a reverse channel in a mobile communication system, the apparatus comprising:
- an encoding section for channel-encoding reverse data transmitted over a reverse traffic channel and a signal on a reverse rate indicator (RRI) channel indicating reverse data rate; and
- a transmission power controller for receiving the encoded reverse data and RRI channel signal and a signal on a primary pilot channel, comparing a first data rate of a current frame with a second data rate of a previous frame, and adjusting a transmission power gain of the signals according to the comparison result;
- wherein when the first data rate is greater than the second data rate, the transmission power controller determines transmission power of each of the reverse traffic channel and the RRI channel so that the determined transmission power has a predetermined ratio with the total transmission power of the primary pilot channel and a secondary pilot channel, and controls gains of the reverse traffic channel signal and the RRI channel signal according the determined transmission power.

25. The mobile station transmission apparatus of claim 24, wherein if the first data rate is greater than the second data rate, the transmission power controller adjusts a gain of the pilot channel signal to a transmission power corresponding to a pilot reference level for the second data rate, and additionally increases transmission power of the RRI channel signal by a difference in pilot reference level between the first data rate and the second data rate.

26. The mobile station transmission apparatus of claim 24, wherein if the first data rate is less than or equal to the second data rate, the transmission power controller holds transmission power for the RRI channel signal.

* * * * *